United States Patent
Väre et al.

(10) Patent No.: US 8,744,010 B2
(45) Date of Patent: Jun. 3, 2014

(54) PROVIDING SIGNALING INFORMATION IN AN ELECTRONIC SERVICE GUIDE

(75) Inventors: Jani Petteri Väre, Kaarina (FI); Jyrki Tapio Alamaunu, Turku (FI)

(73) Assignee: Nokia Corporation, Espoo (FI)

( * ) Notice: Subject to any disclaimer, the term of this patent is extended or adjusted under 35 U.S.C. 154(b) by 425 days.

(21) Appl. No.: 13/106,486

(22) Filed: May 12, 2011

(65) Prior Publication Data

US 2012/0288031 A1 Nov. 15, 2012

(51) Int. Cl.
*H03K 9/00* (2006.01)

(52) U.S. Cl.
USPC ........... 375/316; 370/334; 370/331; 370/332; 370/338; 455/436; 455/442

(58) Field of Classification Search
USPC .................. 375/316; 370/334, 331, 332, 338; 455/436, 442
See application file for complete search history.

(56) References Cited

U.S. PATENT DOCUMENTS

| | | | |
|---|---|---|---|
| 2006/0084435 | A1 | 4/2006 | Borsos et al. |
| 2006/0123099 | A1* | 6/2006 | Paila et al. ............. 709/219 |
| 2006/0212902 | A1* | 9/2006 | Seo et al. ............. 725/39 |
| 2007/0045416 | A1 | 3/2007 | Paila et al. |
| 2007/0123252 | A1 | 5/2007 | Tronc et al. |
| 2007/0173194 | A1 | 7/2007 | Vare et al. |
| 2008/0039107 | A1 | 2/2008 | Ma et al. |
| 2008/0225778 | A1 | 9/2008 | Vare et al. |
| 2009/0064244 | A1 | 3/2009 | Shin et al. |
| 2009/0077585 | A1 | 3/2009 | Singhai et al. |
| 2009/0094356 | A1 | 4/2009 | Vare |
| 2009/0103649 | A1 | 4/2009 | Vare et al. |
| 2009/0111448 | A1* | 4/2009 | Paila .............................. 455/418 |
| 2009/0187949 | A1 | 7/2009 | Vare et al. |
| 2009/0203326 | A1 | 8/2009 | Vesma et al. |
| 2009/0232194 | A1 | 9/2009 | Yoshida |
| 2009/0291631 | A1 | 11/2009 | Xue et al. |
| 2009/0318151 | A1 | 12/2009 | Jung et al. |
| 2010/0043026 | A1 | 2/2010 | De Cuetos et al. |
| 2010/0058387 | A1 | 3/2010 | De Cuetos et al. |
| 2010/0083311 | A1 | 4/2010 | Vare et al. |
| 2010/0115552 | A1 | 5/2010 | Lee et al. |
| 2010/0180310 | A1 | 7/2010 | Lee et al. |

(Continued)

FOREIGN PATENT DOCUMENTS

| | | |
|---|---|---|
| EP | 2134093 | 12/2009 |
| EP | 2154810 | 2/2010 |

(Continued)

OTHER PUBLICATIONS

International Search Report and Written Opinion for PCT/FI2012/050391 dated Oct. 4, 2012.

(Continued)

*Primary Examiner* — Siu Lee
(74) *Attorney, Agent, or Firm* — Banner & Witcoff, Ltd.

(57) ABSTRACT

Apparatuses may perform and methods may include: receiving a digital broadcast signal that includes an Electronic Service Guide (ESG); extracting and assembling the ESG; extracting from the ESG signaling information which links one or more services in an upper level layer of a broadcast protocol to a physical layer of the broadcast protocol. Based on the signaling information, one or more services from a broadcast system may be accesses.

14 Claims, 22 Drawing Sheets

(56) References Cited

U.S. PATENT DOCUMENTS

| | | | |
|---|---|---|---|
| 2010/0195633 A1* | 8/2010 | Vare et al. | 370/338 |
| 2010/0211977 A1 | 8/2010 | Song et al. | |
| 2010/0233962 A1 | 9/2010 | Johansson et al. | |
| 2010/0262708 A1 | 10/2010 | Bouazizi et al. | |
| 2010/0283912 A1 | 11/2010 | Sun et al. | |
| 2010/0287461 A1* | 11/2010 | Paila et al. | 715/236 |
| 2010/0299708 A1 | 11/2010 | Xu et al. | |
| 2010/0322355 A1 | 12/2010 | Vare et al. | |
| 2011/0099577 A1* | 4/2011 | Campana et al. | 725/39 |
| 2011/0103300 A1 | 5/2011 | Vare et al. | |
| 2011/0222610 A1 | 9/2011 | Gao et al. | |
| 2011/0235721 A1 | 9/2011 | Chen et al. | |
| 2012/0051320 A1 | 3/2012 | Vare et al. | |
| 2012/0128101 A1 | 5/2012 | Chen et al. | |
| 2012/0239785 A1 | 9/2012 | Pazos | |
| 2012/0254684 A1 | 10/2012 | Loghin et al. | |
| 2012/0288031 A1 | 11/2012 | Vare et al. | |
| 2012/0307842 A1 | 12/2012 | Petrov et al. | |

FOREIGN PATENT DOCUMENTS

| | | |
|---|---|---|
| EP | 2200302 | 6/2010 |
| EP | 2207293 | 7/2010 |
| EP | 2268004 | 12/2010 |
| WO | 2011087507 | 7/2011 |

OTHER PUBLICATIONS

International Search Report and Written Opinion for PCT/FI2012/050756 mailed Nov. 13, 2012.

OMA-BCAST Service Guide for Mobile Broadcast Services, Candidate Version 1.1—Sep. 14, 2010, 302 pages.

Handley, et al., "SDP—Session Description Protocol", IETF RFC 4566, Jul. 2006, <http://www.ietf.org/rfc/rfc4566.txt>, 46 pages.

Paila, et al., "FLUTE—File Delivery over Unidirectional Transport", RFC 3926, Oct. 2004, <http://www.ietf.org/rfc/rfc3926.txt>, 33 pages.

Luby, et al., "Asynchronous Layered Coding (ALC) Protocol Instantiation", RFC 3450, Dec. 2002, <http://www.ietf.org/rfc3450.txt., 32 pages.

Luby, et al., "Layered Coding Transport (LCT) Building Block", RFC 3451, Dec. 2002, <http://www.ietf.org/rfc/rfc3451.txt>, 28 pages.

"Multimedia Broadcast/Multicast Service (MBMS); Protocols and codecs", 3rd Generation Partnership Project, Technical Specification 3GPP TS 26.346 Release 8, <http://www.3gpp.org/ftp/Specs/>, 2 pages.

Faria, F., et al., DVB-H: Digital Broadcast Services to Handheld Devices, Proceedings of the IEEE, vol. 94, No. 1, pp. 194-209, Jan. 2006.

Xiaodong Y., et al., A Survey of Handover Algorithms in DVB-H, IEEE Communications Surveys & Tutorials, vol. 8, No. 44, pp. 16-29, 4th Quarter 2006.

International Search Report for PCT/FI2011/050680 dated Oct. 26, 2011.

Digital Video Broadcasting (DVB); Frame structure channel coding and modulation for a second generation digital terrestrial television broadcasting system (DVB-T2), ETSI EN 302 755 v1.1.1 (Sep. 2009), European Standard (Telecommunications series).

Digital Video Broadcasting (DVB); Transmission System for Handheld Terminals (DVB-H), ETSI EN 302 304 v1.1.1 (Nov. 2004), European Standard (Telecommunications series).

Digital Video Broadcasting (DVB); DVB specification for data broadcasting, ETSI EN 301 192 v1.5.1 (Nov. 2009), European Standard (Telecommunications series).

Digital Video Broadcasting (DVB); Framing structure, channel coding and modulation for digital terrestrial television, ETSI EN 300 744 v1.6.1 (Jan. 2009), European Standard (Telecommunications series).

Commercial Requirements for DVB-NGH DVB CM-NGH, Version 1.01, Jun. 15, 2009.

ETSI EN 300 468 (DVB SI), V1.11.1, Digital Video Broadcasting (DVB); Specification for Service Information (SI) in DVB Systems, Apr. 2010.

International Search Report and Written Opinion for PCT/FI2012/050521 dated Oct. 15, 2012.

ETSI TS 102 471 V1.4.1, "Digital Video Broadcasting(DVB) IP Datacast over DVB-H: Electronic Service Guide (ESG)," 139 pages, Mar. 2010.

U.S. Appl. No. 13/198,989—Non-Final Office Action dated Mar. 20, 2013.

U.S. Appl. No. 13/168,087—Non-Final Office Action dated Apr. 25, 2013.

U.S. Appl. No. 13/297,469—Non-Final Office Action dated Jul. 3, 2013.

* cited by examiner

PROVIDING SIGNALING INFORMATION IN AN ELECTRONIC SERVICE GUIDE

BACKGROUND

Communication networks, such as a digital broadband broadcast network, enable end users to receive digital content including video, audio, data, and so forth. Using an electronic device, a user may receive digital content over a communication network, such as a wireless digital broadcast network. An electronic device, such as a mobile device, may receive a program or service in a data or transport stream. The transport stream carries individual elements of the program or service such as the audio, video, or text components of the program or service. In some systems, the electronic device locates the different components of a particular program or service in a data stream through Program Specific Information (PSI) or Service Information (SI) embedded in the data stream. However, PSI or SI signaling may be insufficient in some wireless communications systems, such as Digital Video Broadcasting-Handheld (DVB-H) systems. Use of PSI or SI signaling in such systems requires a large amount of bandwidth which is costly, decreases efficiency of the system, and may result in a sub-optimal end user experience Digital content can be transmitted in a cell within a network. A cell may represent a geographical area that may be covered by a transmitter in a communication network. A network may have multiple cells and cells may be adjacent to other cells. When a device moves between cells, a handover procedure may be initiated. Performing a handover may allow for an electronic device to continue receiving services or programs from the communication network. The processing that occurs during a handover, such as the discovery of services in the neighboring cell, may decrease the efficiency of the system and may result in a sub-optimal end user experience.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An electronic service guide may be provided over a broadcast network. The electronic service guide describes the services and content available from providers to client devices over the broadcast network. The broadcast network may conform to a communication broadcast protocol such as Digital Video Broadcasting-Next Generation Handheld (DVB-NGH), and the electronic service guide may conform to a format such as the Open Mobile Alliance Service Guide for Mobile Broadcast Services.

In various embodiments, signaling information for the broadcast protocol may be carried within the electronic service guide. The signaling information can be level 2 signaling information and upper level signaling information. The level 2 signaling information may include local multiplex information and other multiplex information.

BRIEF DESCRIPTION OF THE DRAWINGS

Certain embodiments are illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which are shown by way of illustration various embodiments in which the invention may be practiced. It is to be understood that other embodiments may be utilized and structural and functional modifications may be made without departing from the scope of the present invention.

Figure 1A:
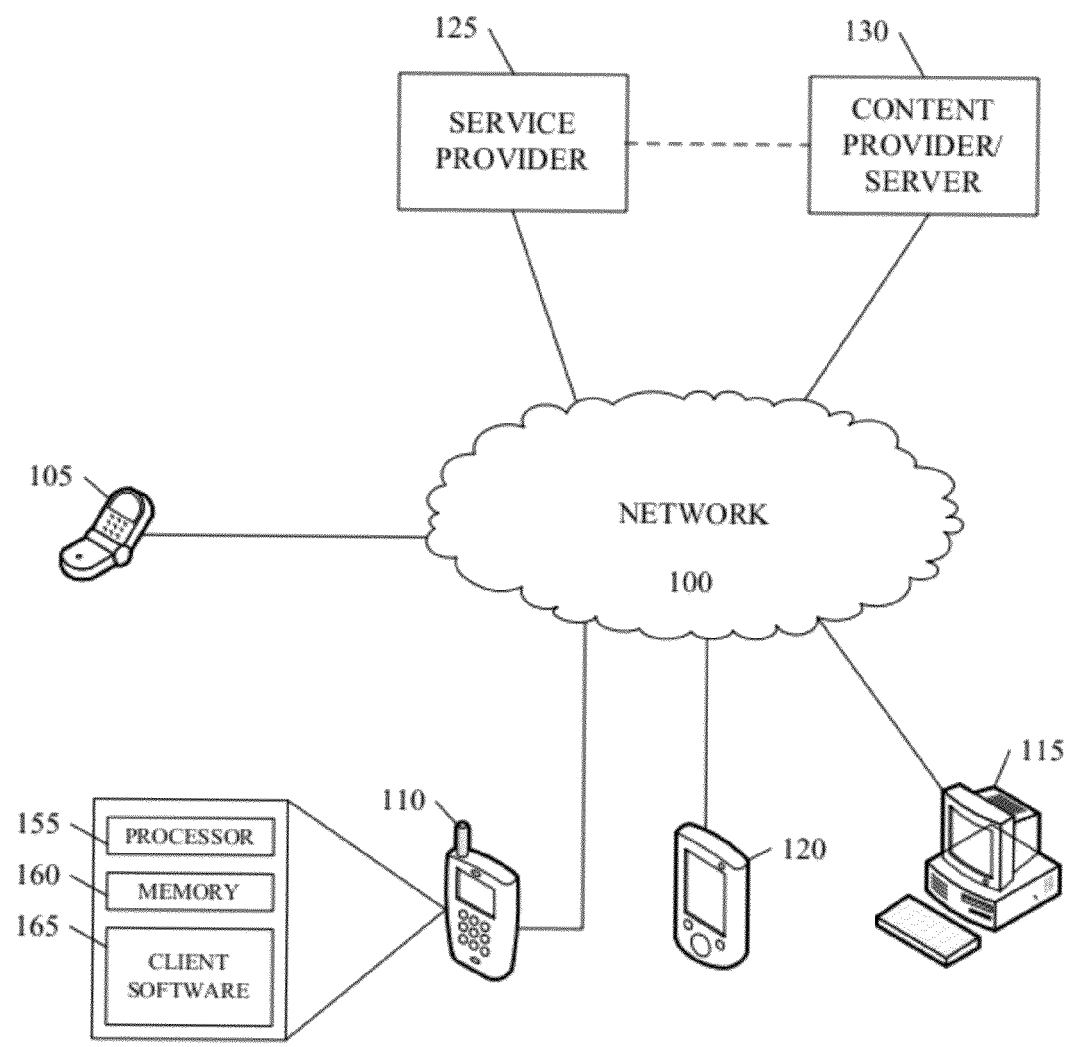
FIG. 1A is a block diagram of an example communication network in which one or more embodiments may be implemented.

FIG. 1A illustrates an example communication system through which various embodiments may be practiced. Systems, such as the systems illustrated in FIGS. 1A and 1B, may utilize a digital broadband broadcast technology, such as Digital Video Broadcast-Next Generation Handheld (DVB-NGH). Examples of other digital broadcast standards with which digital broadband broadcast systems may comply include, without limitation, Digital Video Broadcast-Terrestrial (DVB-T), Digital Video Broadcast-Second Generation Terrestrial (DVB-T2), Digital Video Broadcast-Handheld (DVB-H), Integrated Services Digital Broadcasting-Terrestrial (ISDB-T), Advanced Television Systems Committee (ATSC) Data Broadcast Standard, Advanced Television Systems Committee-Mobile/Handheld (ATSC-M/H), Digital Multimedia Broadcast-Terrestrial (DMB-T), Terrestrial Digital Multimedia Broadcasting (T-DMB), Terrestrial Digital Audio Broadcasting (T-DAB), Satellite Digital Multimedia Broadcasting (S-DMB), Terrestrial/Satellite Digital Multimedia Broadcasting (T/S-DMB), Forward Link Only (FLO), Digital Audio Broadcasting (DAB), and Digital Radio Mondiale (DRM). Other digital broadcasting standards and techniques, now known or later developed, may also be used. Embodiments of the invention may also be applicable to other systems such 3GPP MBMS (Multimedia Broadcast/Multicast Services) and 3GPP2 BCMCS (Broadcast/Multicast Service).

As seen in FIG. 1A, the system may include a number of computers and electronic devices, including mobile communication device 105, mobile phone 110, personal digital assistant (PDA) or mobile computer 120, personal computer (PC) 115, service provider 125 and content provider/server 130. The various devices in the system may communicate with one another and with other devices through network 100. Network 100 may include wired and wireless connections and network elements, and connections over the network may include permanent or temporary connections. Communication through network 100 is not limited to the illustrated devices and may include additional mobile or fixed devices. Such additional mobile or fixed devices may include a video storage system, an audio/video player, a digital camera/camcorder, a positioning device such as a GPS (Global Positioning System) device or satellite, a television, an audio/video player, a radio broadcasting receiver, a set-top box (STB), a digital video recorder, remote control devices and the like.

Although shown as a single network in FIG. 1A for simplicity, network 100 may include multiple networks that are interlinked so as to provide internetworked communications. Such networks may include one or more private or public packet-switched networks, for example the Internet, one or more private or public circuit-switched networks, for example a public switched telephone network, a cellular network configured to facilitate communications to and from mobile communication devices 105 and 110, for example through use of base stations, mobile switching centers, etc., a short or medium range wireless communication connection, for example Bluetooth®, ultra wideband (UWB), infrared, WiBree, wireless local area network (WLAN) according to one or more versions of Institute of Electrical and Electronics Engineers (IEEE) standard no. 802.11, or a high-speed wireless data network such as Evolution-Data Optimized (EV-DO) networks, Universal Mobile Telecommunications System (UMTS) networks, Long Term Evolution (LTE) networks or Enhanced Data rates for GSM Evolution (EDGE) networks. Devices 105-120 may use various communication protocols such as Internet Protocol (IP), Transmission Control Protocol (TCP), and Simple Mail Transfer Protocol (SMTP) among others known in the art. Various messaging services such as Short Messaging Service (SMS) and/or Multimedia Message Service (MMS) may also be included.

Devices 105-120 may be configured to interact with each other or other devices, such as content provider/server 130 or service provider 125. In one example, mobile device 110 may include client software 165 that is configured to coordinate the transmission and reception of information to and from content provider/server 130. In one arrangement, client software 165 may include application or server specific protocols for requesting and receiving content from content provider/server 130. For example, client software 165 may comprise a Web browser or mobile variants thereof and content provider/server 130 may comprise a web server. Billing services (not shown) may also be included to charge access or data fees for services rendered. In one arrangement where service provider 125 provides cellular and/or wireless network access, client software 165 may include instructions for access and communication through the cellular and/or wireless network. Client software 165 may be stored in computer-readable memory 160 such as read only, random access memory, writeable and rewriteable media and removable media in device 110 and may include instructions that cause one or more components—for example, processor 155, a transceiver, and a display—of device 110 to perform various functions and methods including those described herein.

Figure 1B:
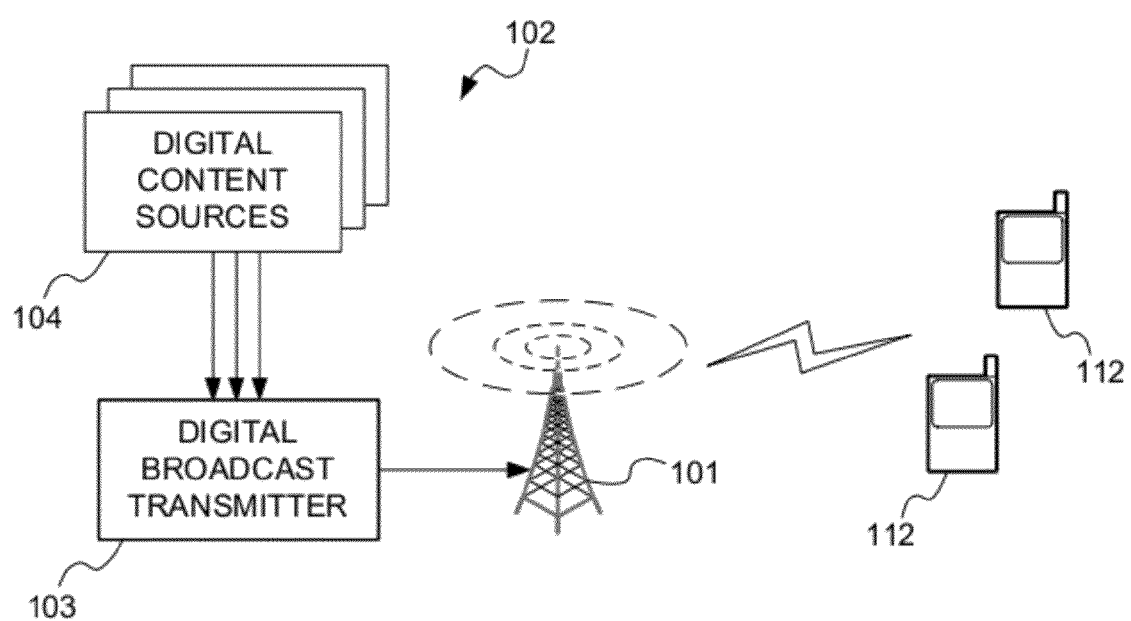
FIG. 1B is a block diagram of another example communication network in which one or more embodiments may be implemented.

FIG. 1B illustrates another example communication system through which various embodiments may be practiced. Digital content may be created and/or provided by digital content sources 104 and may include video signals, audio signals, data, and so forth. Digital content sources 104 may provide content to digital broadcast transmitter 103 in the form of digital packets, e.g., Internet Protocol (IP) packets. A group of related IP packets sharing a certain unique IP address or other source identifier is sometimes described as an IP stream. Digital broadcast transmitter 103 may receive, process, and forward for transmission multiple IP streams from multiple digital content sources 104. The processed digital content may then be passed to transmitter 101 (e.g., a digital broadcast tower), or other physical transmission component for wireless transmission. Ultimately, mobile terminals or devices 112 may selectively receive and consume digital content originating from digital content sources 104. Communication over the communication network may be bi-directional, with mobile terminals or devices 112 selectively transmitting digital content to other mobile terminals or devices 112, to digital content services 104, or to other devices configured to receive digital content through the communication network.

Figure 1C:
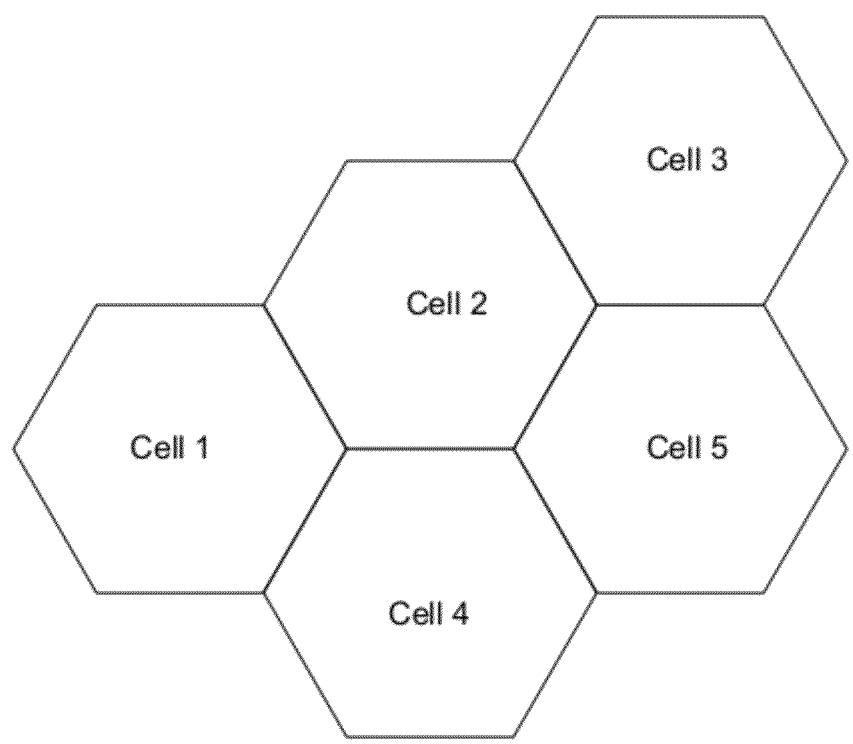
FIG. 1C illustrates an example of cells, each of which may be covered by one or more different transmitters in accordance with one or more embodiments described herein.

A communication system may be comprised of a plurality of different cells. FIG. 1C illustrates an example of cells, each of which may be covered by one or more different transmitters. A cell may define a geographical area that may be covered by a transmitter. A cell may be of any size and may have neighboring cells. In this example, Cell 1 represents a geographical area that is covered by a transmitter for a communication network. Cell 2 is next to Cell 1 and represents a second geographical area that may be covered by a different transmitter. Cell 2 may, for example, be a different cell within the same network as Cell 1. Alternatively, Cell 2 may be in a network different from that of Cell 1. Cells 1, 3, 4, and 5 are neighboring cells of Cell 2, in this example.

Figure 2:
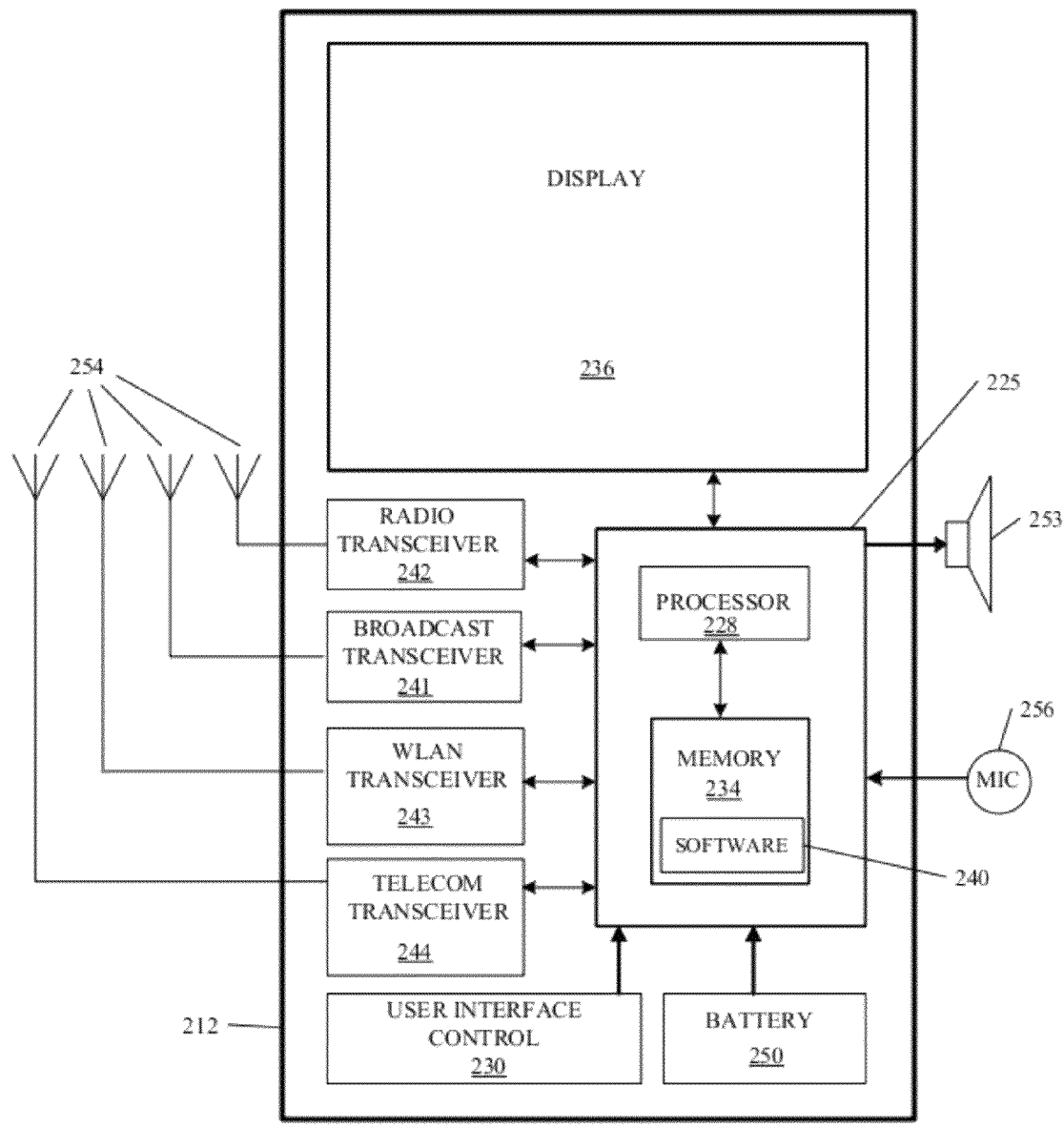
FIG. 2 is a block diagram of an example communication device according to one or more embodiments described herein.

FIG. 2 illustrates an example computing device 212 that may be used in a communication network such as those illustrated in FIGS. 1A-1C, to implement any or all of devices 105, 110, 115, 120, and/or 112. Device 212 may include a controller 225 connected to a user interface control 230, display 236 and other elements as illustrated. Controller 225 may include one or more processors 228 and memory 234 storing software 240, for example, client software 165 and/or user interface software. Device 212 may also include a battery 250, speaker 253 and one or more antennae 254. Device 212 may include user interface circuitry, such as user interface control 230. User interface control 230 may include controllers or adapters, and other circuitry, configured to receive input from or provide output to a keypad, touch screen, voice interface—for example via microphone 256, function keys, joystick, data glove, mouse and the like. The user interface circuitry and user interface software may be configured to facilitate user control of at least some functions of device 212 though use of a display. Display 236 may be configured to display at least a portion of a user interface of device 212. Additionally, the display may be configured to facilitate user control of at least some functions of the device (e.g., display 236 could be a touch screen).

Computer executable instructions and data used by processor 228 and other components of device 212 may be stored in a storage facility such as memory 234 and/or in hardware logic in an integrated circuit, ASIC, etc. Memory 234 may comprise any type or combination of read only memory (ROM) modules or random access memory (RAM) modules, including both volatile and nonvolatile memory such as disks. Software 240 may be stored within memory 234 to provide instructions to processor 228 such that when the instructions are executed, processor 228, device 212 and/or other components of device 212 are caused to perform various functions or methods such as those described herein. Software may include both applications and operating system software, and may include code segments, instructions, applets, pre-compiled code, compiled code, computer programs, program modules, engines, program logic, and combinations thereof. Computer executable instructions and data may further be stored on computer readable media including electrically erasable programmable read-only memory (EEPROM), flash memory or other memory technology, CD-ROM, DVD or other optical disk storage, magnetic cassettes, magnetic tape, magnetic storage and the like.

Device 212 or its various components may be mobile and be configured to receive, decode and process various types of transmissions including digital broadband broadcast transmissions that are based, for example, on the Digital Video Broadcast (DVB) standard, such as DVB-NGH, DVB-H, DVB-T2, DVB-H+ (hybrid satellite/terrestrial architecture), or Digital Video Broadcasting-Multimedia Home Platform (DVB-MHP), through a specific broadcast transceiver 241. Other digital transmission formats may alternatively be used to deliver content and information regarding availability of supplemental services. Additionally or alternatively, device 212 may be configured to receive, decode and process transmissions through various transceivers, such as FM/AM Radio transceiver 242, wireless local area network (WLAN) transceiver 243, and telecommunications transceiver 244.

Although the above description of FIG. 2 generally relates to a mobile device, other devices or systems may include the same or similar components and perform the same or similar functions and methods. For example, a stationary computer (e.g., PC 115 of FIG. 1A) may include the components or a subset of the components described above and may be configured to perform the same or similar functions as device 212 and its components.

Some digital video broadcasting protocols provide signaling information to allow for the discovery and reception of services and other data at an electronic device (e.g., device 212 of FIG. 2). The signaling information may provide mapping information for various services to the link layer pipes (LLPs) and physical layer pipes (PLPs) used in the broadcast system network when transmitting data from a source (e.g., service provider 125 and/or content provider 130 of FIG. 1A) to a destination (e.g., device 110 of FIG. 1A). Link layer pipes, which may also be referred to as logical layer pipes, bundle one or more physical layer pipes into one logical entity. A service may include several components that together form the service. Components can be also shared between two or more different services. A typical example of a service that includes several components is a teletext service or other non-real time service, which uses the same components for all channels from the same service provider. The shared non-real time service component may be transmitted in a dedicated PLP that is the same for all channels.

Audio/Video (AV) content is another example of component transmission. For scalable video coding, a service may include an audio component, a base layer video component, and an enhancement layer video component. The base layer video component may have lower resolution than the enhancement layer video component. The AV components of each service might not be shared with other services, and may be sufficiently synchronous with each other to avoid problems at a receiver. Example embodiments permit transmission of multiple service components within the same PLP or different PLPs, as well as with different robustness levels for the components.

Figure 3:
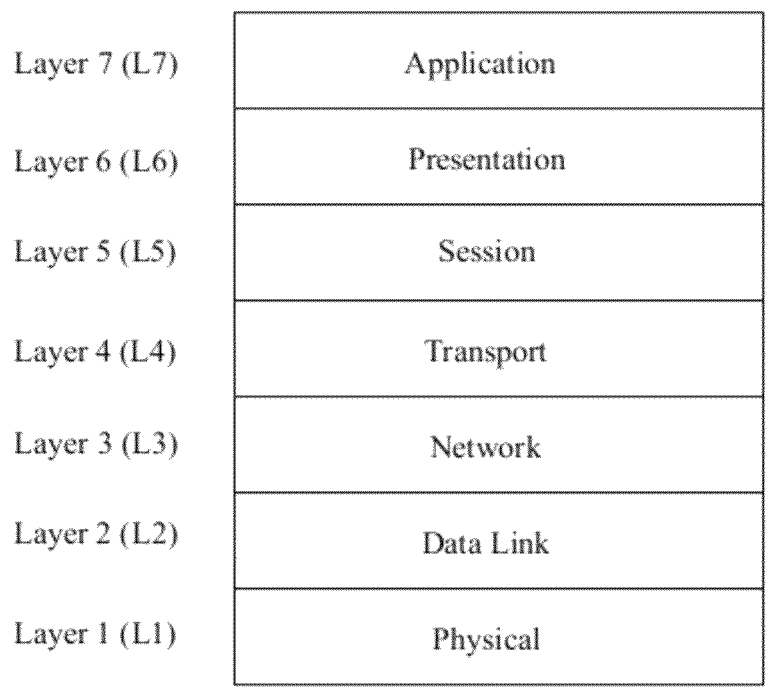
FIG. 3 illustrates an example data model for network transmissions according to one or more embodiments described herein.

According to some digital video broadcasting protocols, components that make up a particular service like a content program or an interactive function are mapped to one or more PLPs. A physical layer, as used herein, generally refers to a portion of a network protocol that is configured to define hardware-specific operations for effecting the transmission or reception of electronic signals over a data network. The physical layer is configured to facilitate the transmission of raw bits from a source to a destination. The physical layer may be configured to specify frequencies, voltages, bit rates and the like for transmission of data. The Open Systems Interconnection (OSI) Reference Model, for example, provides for a layered communication architecture including a physical layer (L1). FIG. 3 illustrates one representation of an OSI Reference Model.

A PLP generally refers to a transmission channel between a source and a destination node defined at the physical layer. The physical layer may define multiple channels—pipes—through which raw bits representative of the data such as broadcast data may be sent. For example, different broadcast services and data associated therewith may be mapped to different physical layer pipes through which the data is transmitted. Accordingly, the physical layer may be configured to identify the appropriate transmission channel for a series of bits corresponding to a particular service and transmit the data through the identified channel or pipe. In a broadcast arrangement, a PLP may be established between a source and multiple destinations. In one example, a PLP may correspond to a physical layer multiplexed channel (i.e., a multiplex) that is carried by specified slices of a transmission stream (e.g., a DVB-T2 stream, which uses time-division multiplexing). When an end-user device wishes to access a component of a particular service, the end-user device may identify the corresponding PLP or PLPs from which to access the service data. In the broadcast scenario, a receiving device may listen for the particular PLP or PLPs carrying the desired service or services.

PLPs corresponding to components of a single service may be identified by combining PLPs into a logical grouping—into a link layer pipe—that is associated with a service. LLPs generally refer to logical associations such as mappings that link a service or service components to a PLP. The logical associations may also include indications of the type of the PLPs associated with the services or the service components. These association types may for example refer to the content transmitted in a particular PLP, or the location of the PLP with respect to other PLPs. For example, association type could indicate that a particular PLP is an anchor PLP. Such anchor PLPs may carry the most important data related to a particular service. LLPs may be defined using various data structures such as tables, lists and the like. PLPs may be identified for accessing components of a service by determining the logical grouping or LLP associated with that service and examining PLP parameters specified thereby. In one example, an LLP may be identified in a service descriptor configured to advertise available services to network devices, such as mobile phones, computers and set-top boxes. LLP identification information may be carried in a packet header of the broadcast transmission stream. Alternatively or additionally, LLP information, (e.g., example LLP identifiers) for each service may be specified in electronic service guide data or layer 2 signaling. Thus, upon receiving the packet header and/or electronic service guide data, a receiving device such as cell phone may extract LLP information to identify components of a service and their associated PLPs.

An LLP may comprise multiple frames, which may be used to allow for the fair division of resources in a broadcast transmission stream. Accordingly, a first frame of an LLP may be transmitted at time T1, while a second frame may be transmitted at time T2 and a third frame may be transmitted at time T3. The interval between the transmission of each frame in an LLP may be defined by a parameter (e.g., $T_{INT\_LLPF}$). The parameter may define the amount of time between two consecutive frames of a particular LLP. During the time between frames of an LLP, frames of other LLPs may be transmitted. Accordingly, transmission bandwidth and resources may be divided amongst multiple LLPs. LLP frames may vary in size from frame to frame. LLP frame size may be defined as $BS_{LLPF}$ (buffer size of LLP frame). This frame size may be, for example, the size of the largest LLP frame within an LLP. A receiver may determine whether it has buffering capacity to receive an entire LLP based on the $BS_{LLPF}$ and a time between two consecutive frames of a LLP, indicated for example by $T_{INT\_LLPF}$ as described above. Additionally or alternatively, $BS_{LLPF}$ may be required to be less than or equal to a specified size of the received buffer ($B_R$) for reception of a LLP.

Grouped PLPs for a particular LLP may be defined by specified slots or slices and packet sizes in a transmission stream. For example, a first PLP for an LLP might be defined as occupying the $1^{st}$, $5^{th}$, and $9^{th}$ slices in a payload portion of a T2 frame. PLPs may occupy different numbers of available slots or slices; for example, a PLP may be twice as large as another PLP and, therefore may occupy twice the number of available slots. A remainder of a T2 frame may be apportioned to header data and other LLP frames of other services.

Figure 4A:
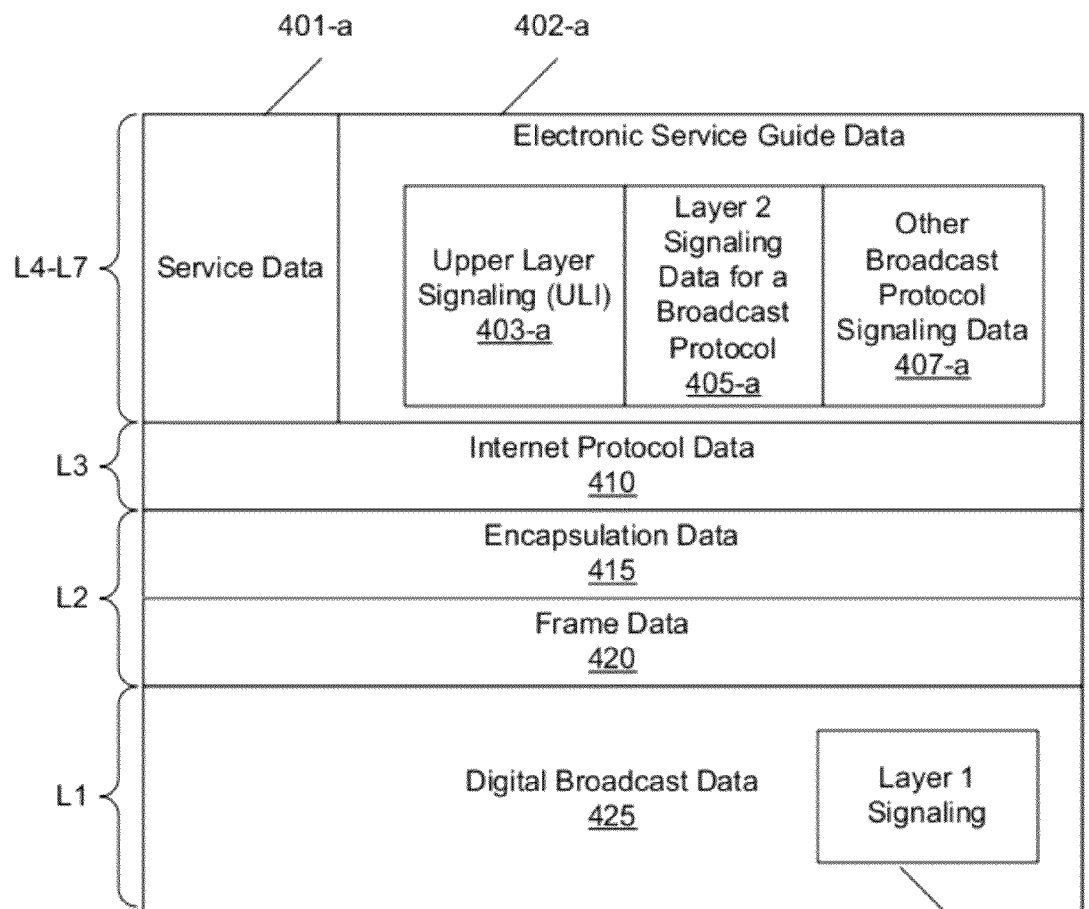
FIGS. 4A-4G illustrate example protocol stacks of the signaling structures for a digital broadcast system according to one or more embodiments described herein.
Figure 4B:
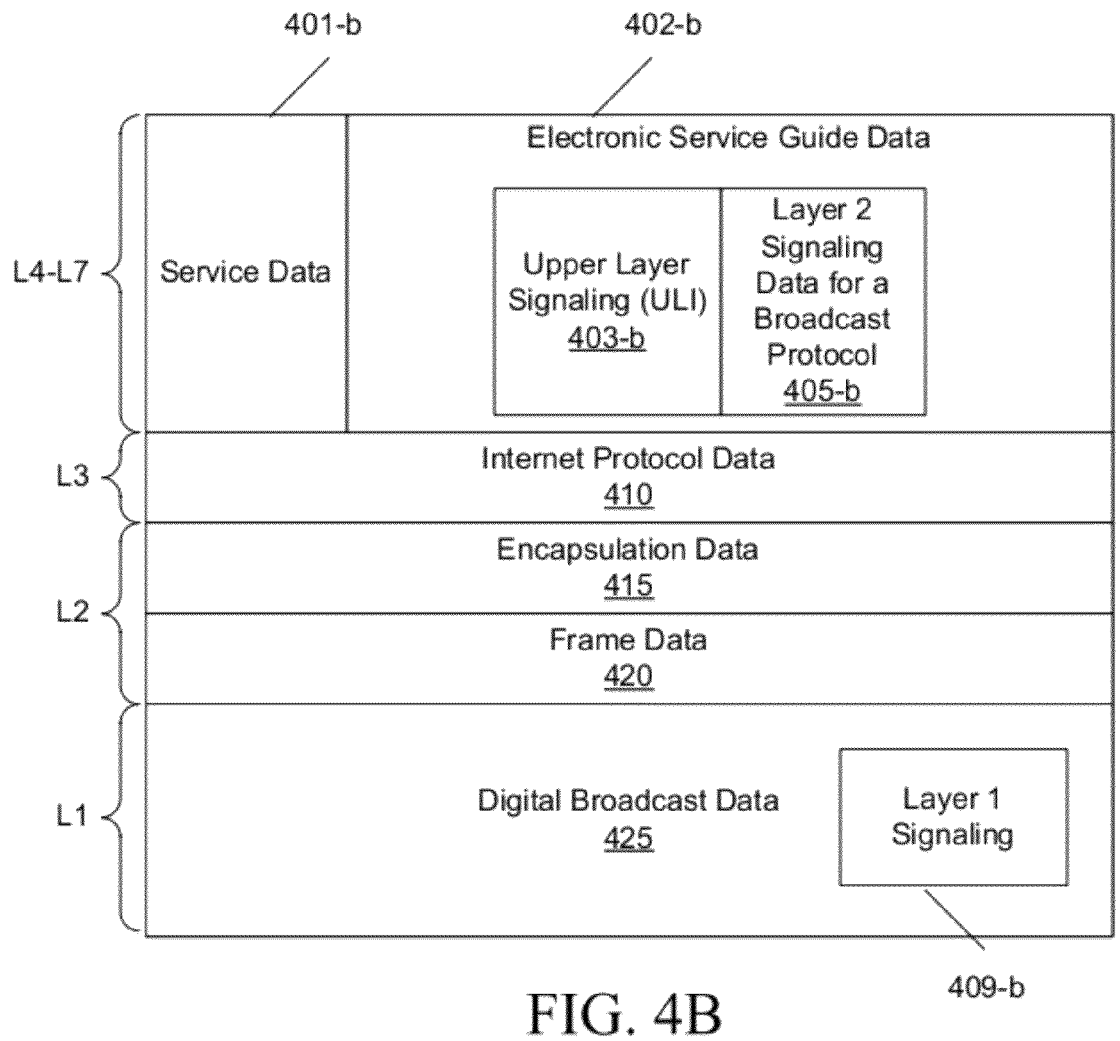

FIGS. 4A and 4B illustrate example protocol stacks of a signaling structure for a digital broadcast system. The examples illustrated in FIGS. 4A and 4B may be used as protocol structures for a DVB-NGH system delivering an electronic service guide (ESG) along with other content and services. DVB-NGH is an Internet Protocol based system that may be used to deliver content and services. DVB-NGH can be used in conjunction with other DVB broadcast systems, such as DVB-T2, DVB-T, DVB-H, etc. DVB-NGH may support broadcast delivery of services across different networks, and such support may include allowing for continuity of service. The data depicted in FIGS. 4A and 4B may be transmitted in one or more dedicated and/or dynamically allocated LLPs and may be transmitted in one or more dedicated and/or dynamically allocated PLPs, used by the system.

As illustrated in FIG. 4A, the example protocol stack includes electronic service guide (ESG) data 402-a, which identifies one or more services or content communicated as service data 401-a, which are available to client devices. In addition to identifying available services, the ESG data 402-a, may also include all or portions of the signaling data above the layer 2 protocol. This signaling data may include upper layer signaling (ULI) 403-a, layer 2 (L2) signaling data for a broadcast protocol (e.g., DVB-NGH) 405-a, and other broadcast protocol signaling data 407-a. For example, the signaling data carried in the protocol stack of FIG. 4A can include signaling data specific to a particular system (e.g., DVB-NGH signaling in L2 signaling data 405-a) and signaling of other systems (e.g., DVB-H signaling, DVB-T signaling, DVB-T2 signaling, etc., in other broadcast protocol signaling data 407-a). In some embodiments, the service data 401-a and ESG data 402-a (including 403-a, 405-a, and 407-a) may be carried on top of OSI layer 3 information.

For example, the ESG data 402-a data may be carried on top of the Internet Protocol layer, which includes Internet Protocol data 410. Below the Internet Protocol layer may be data that includes encapsulation data 415, frame data 420 and digital broadcast data (e.g., DVB-NGH physical layer data) 425. Layer 1 (L1) signaling 409-a may be carried with the digital broadcast data 425.

In various embodiments, the signaling data for other systems included in other broadcast protocol signaling data 407-a may be provided outside of ESG data 402-a, and may be allocated in dedicated and/or dynamically allocated IP addresses and ports. Additionally, the signaling data for the other systems can be transmitted in dedicated and/or dynamically allocated PLPs within a frame, such as a DVB-NGH frame.

FIG. 4B illustrates a protocol stack for a dedicated system (e.g., a system dedicated to DVB-NGH), which includes service data 401-b and ESG data 402-b. Like ESG data 402-a, ESG data 402-b identifies one or more services or content communicated as service data 401-b, which are available to client devices. In addition to identifying available services, the ESG data 402-b, may also include all or portions of the signaling data above the layer 2 protocol. The signaling data may include upper layer signaling (ULI) 403-b, and L2 signaling data for the broadcast protocol (e.g., DVB-NGH) 405-b. In some embodiments, the service data 401-b and ESG data 402-b (including 403-b and 405-b) may be carried on top of OSI layer 3 information. For example, the L2 signaling data may be carried on top of the Internet Protocol layer, which includes Internet Protocol data 410. Below the Internet Protocol layer may be data that includes encapsulation data 415, frame data 420 and digital broadcast data (e.g., DVB-NGH physical layer data) 425. L1 signaling 409-b may be carried with the digital broadcast data 425.

One example of ESG data 402-a and 402-b transmitted on top of layer 3 Internet Protocol 410 is described in the Open Mobile Alliance (OMA)—Service Guide for Mobile Broadcast Services specification, OMA-TS-BCAST Service Guide-V1_1, dated Sep. 14, 2010 (hereinafter OMA BCAST ESG). The OMA BCAST ESG standard is incorporated herein by reference in its entirety.

The Electronic Service Guide (ESG) may be used to provide program or service related information. Generally, an Electronic Service Guide (ESG) enables a terminal to communicate what services are available to end users and how the services may be accessed. The ESG may include independently existing pieces of ESG fragments. In various examples, ESG fragments include XML and/or binary documents, and may encompass a vast array of items, such as for example, a SDP (Session Description Protocol) description of media files, textual files, and/or an image. In some variations, ESG fragments may each be separate well-formed XML documents that are uniquely identifiable, and the entire ESG may be defined as a set of these fragments. Because each fragment is a complete XML document, which is unique, the fragments may be individually replaced and updated as programming content and services change.

The ESG fragments describe one or several aspects of currently available (or future) services, content, or broadcast programs. Such aspects may include for example: free text description, schedule, geographical availability, price, purchase method, genre, and supplementary information such as preview images or clips.

The ESG fragments may be organized and formatted into different types. For example, one type of fragment referred to as a service fragment may describe a broadcast service and include metadata that identifies content items associated with the service, availability of the service, and an overall description of the service. This service fragment may point to other fragments, which provide further details of the service. The other fragments may provide detailed descriptions of content items within a service, define timeframes of the content items are streamed/downloaded and rendered, describe capabilities and options for a terminal to access content and services, describe groups of services which may be provided together, describe purchase and pricing information for groups of services, describe subscription channels on which purchased services may be obtained, provide preview information, and provide information about interactivity of services.

Certain ESG fragments may also provide session description information for each service, which includes information for session initiation of a service, such as a multimedia service. Theses session description fragments may include session description information that conveys session announcements, and other description information used for delivery procedures to initiate a session of a service. The session description information in the ESG for a service may be formatted according to the Session Description Protocol (SDP) defined in the Request for Comment standard, RFC4566, published by the Internet Engineering Task Force (IETF), or according to 3GPP the MBMS User Service Bundle Description standard 3GPP TS 26.346.

For each service, certain ESG fragments may provide access information that describe how a client device may access the service. These access fragments may include information on the delivery method of the service, the required capabilities of the client device to use the service, and provide alternative ways to access or interact with the service. The access fragments may include reference to the session description fragments described above, or include the session description information directly in SDP format or another format.

In various embodiments, the fragments may also include metadata related specifically to mobile broadcasting. The metadata may identify availability of a service within a broadcast region such as identifying which cells in FIG. 1C a particular service may be broadcast.

Each service included in the ESG information may have a Global service identifier, which may be a unique identifier of the service. Each service may be associated with one or more components that may respectively transport audio, video, text, etc. Each component may be associated with a uniform resource identifier (URI) to identify information corresponding to the components of the desired service from service association information. In one example, using ESG information, service association information, and local multiplex information, a receiving device may identify a particular PLP carrying a component of a desired service as previously described. ESG information may be received via any type of bearer (for example, application, point-to-point, broadcast, etc.).

The services may include audio, video and other types of data, and may include Open Mobile Alliance Mobile Broadcast (OMA BCAST) services. The service data and the ESG data may be transmitted through a variety of types of networks according to many different protocols. For example, data can be transmitted through a collection of networks usually referred to as the "Internet" using protocols of the Internet protocol suite, such as Internet Protocol (IP) and User Datagram Protocol (UDP). Data may be transmitted through the Internet addressed to a single user. Data may also be addressed to a group of users, commonly known as multicasting. In the case in which the data is addressed to all users, it is called broadcasting.

In various aspects, the ESG fragments may be grouped and encapsulated together into service guide delivery units (SGDUs) for delivery as transport objects in the transport layer. The SGDUs may be protocol independent. In various examples, the transport layer may be based on a User Datagram Protocol (UDP) layer, which may be carried on top of the Internet Protocol Data layer 410 in FIGS. 2A and 2B. One such UDP based transport layer protocol may include a combination of File Delivery over Unidirectional Transport (FLUTE) and Asynchronous Layered Coding/Layered Coding Transport (ALC/LCT). FLUTE, ALC, and LCT may be as defined in the Request for Comment standards, RFC3926, RFC3450, RFC 3451, respectively, published by the Internet Engineering Task Force (IETF).

The SGDUs may further be delivered as transport objects which have previously been compressed. For example, in one embodiment GNU ZIP (GZIP) compression may be used to compress each of the SGDUs into a GZIP file, which may be broadcast using the FLUTE transport protocol.

Each ESG fragment may have a unique fragment identifier (e.g., a fragment ID) that allows a client device to distinguish one fragment from another. The unique identifier may be a Uniform Resource Identifier (URI). The fragment identifier may be different for fragments in different formats. If the fragment is an XML document, the fragment identifier may be the top level "id" attribute. For other fragment formats, a separate fragment ID may be assigned. Each ESG fragment may also be assigned a transport identifier for addressing the fragments at the transport layer (i.e., within a SGDU). The transport identifier may be independent of the type of format of the ESG fragment. The transport identifier (e.g., fragmentTransportID), may be uniquely assigned to an ESG fragment for the life of the fragment. When the fragment expires, the transport identifier may be updated for a newer version of the same fragment. By monitoring changes in the 'fragmentTransportID' (and another field, 'fragmentVersion'), a terminal can quickly infer whether the associated fragment in the SGDU has changed.

The ESG fragments may be organized within SGDUs differently for different applications. As previously discussed, ESG fragments may be delivered via a broadcast, multicast, or to a single user. When delivered to a single user/client device, the delivery may be in response to specific interactive request from the client device. If delivered in response to a client device request, the request may define how the fragments are organized in the SGDU. For example, a client device may have requested an update for a specific portion of the ESG, and thus the SGDU would contain only updated fragments, related to the requested ESG portion. In the case of a broadcast, the organization of ESG fragments in SGDUs may be fixed and organized to a set of rules. For example, each SGDU may contain ESG fragments that are likely to be updated together, such that when one or more of the fragments in and SGDU is polled in the broadcast and detected as being expired, the entire SGDU may be received and updated.

In addition to the ESG fragments, various embodiments include delivery description data that enables a client device to discover the ESG and services, and describes how the fragments are accessible in the SGDUs within the transport stream. OMA BCAST ESG provides one example of delivery description data referred to as a service guide delivery descriptor (SGDD). The format of the delivery description data may be according to a predefined or standardized XML schema or may be according to some other format.

The delivery description data, (e.g., SGDD) may include mapping information that identifies every fragment of an ESG, indicates the location of each SGDU within a transport protocol, and indicates where each fragment may be found in the SGDUs or other data structures within a transport stream. The delivery description data may include fragment description data such as binding information between the fragment identifier and transport identifier of every fragment, as well as timing data for each fragment to indicate when the fragment is valid or when it is to be displayed, etc. The delivery description data may further provide network and service provider identification information and roaming rules for accessing different services, or portions thereof, across different portions of a network or across different networks. Such data may identify the type of underlying broadcast service on which the ESG and services are provided (e.g., IPDC over DVB-H, DVB-SH, WiMax, DVB-NGH, etc.). The delivery description data may further describe one or more entry points at which the ESG may be accessed, as further discussed below.

The delivery of the delivery description data may be similar to the SGDU, and may be delivered as transport objects within a transport protocol such as UDP, FLUTE, and/or ACL/LCT. The delivery description data may further be compressed to reduce bandwidth requirements for delivering the data. For example, in one embodiment GNU ZIP (GZIP) compression may be used to compress each SGDD into a GZIP file, which may be, for example, broadcast using the FLUTE transport protocol.

As previously indicated, in addition to providing service information, the ESG may also contain the signaling information as shown in FIGS. 4A and 4B. FIGS. 4C-4G illustrate various embodiments of embedding signaling information within ESG constructs.

Figure 4C:
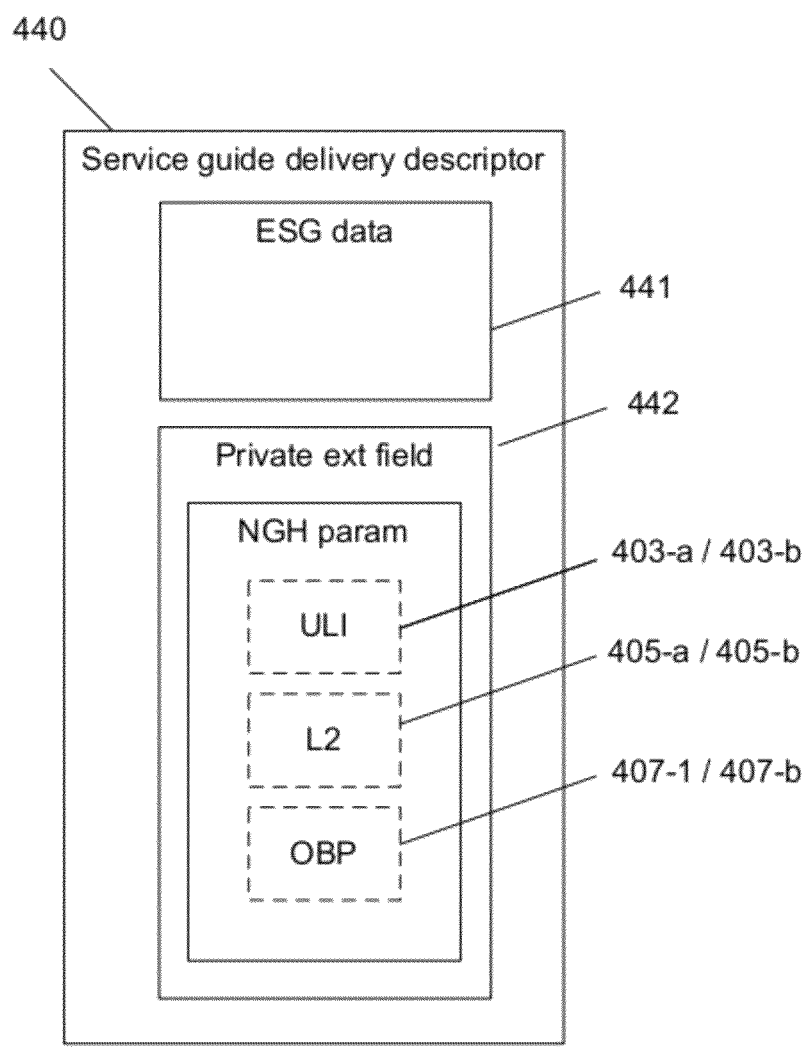

FIG. 4C illustrates one embodiment of delivery description data 440, which may be for example an SGDD as defined in OMA BCAST ESG. SGDD 440 may be an XML document, binary data, or other formatted data that includes the ESG data 441 described above for identifying and locating ESG fragments and other ESG related information. SGDD 440 data may also include a private extension field 442 within the delivery description data. Private extension field 442 may be included as a container for proprietary or application-specific extensions. Within 442, the signaling parameters, such as NGH parameters ULI 403-*a* and 403-*b*, L2 signaling parameters 405-*a* and 405-*b*, and other protocol signaling 407-*a* and 407-*b*, may be included.

Figure 4D:
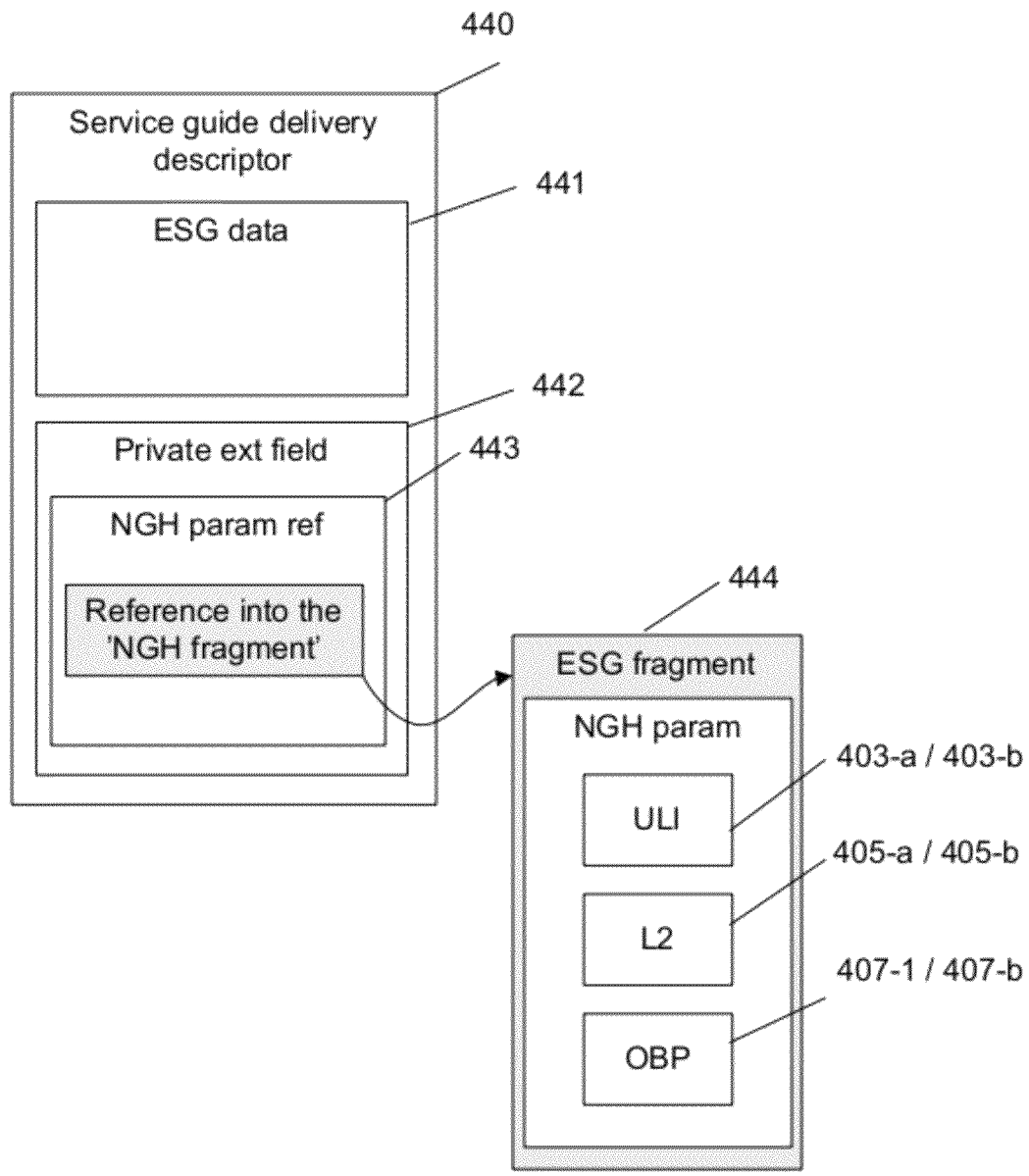

In an alternate embodiment, the ESG may include the signaling parameter in an ESG fragment as illustrated in FIG. 4D. The delivery description data 440, the ESG data 441 and the private extension field 442 may be the same as in FIG. 4C. However, in this embodiment the private extension field includes one or more references 443 to ESG fragments 444, which include the signaling data (e.g., NGH parameters ULI 403-*a* and 403-*b*, L2 signaling parameters 405-*a* and 405-*b*, and other protocol signaling 407-*a* and 407-*b*). The signaling data may be contained in one fragment, or may be partitioned into several fragments as identified by the references 443. In one variation, the references 443 are of the same format provided in the ESG data 441, and the fragments containing the signaling data may be formatted in the same manner as the other ESG fragments contained within SGDUs. The ESG fragments including the signaling data may include a unique identifier (e.g., URI="NGH_service1") by which the fragment may be identified and referenced. In another variation, the fragments containing the signaling data may be of a different customized format tailored to the signaling data.

Figure 4E:
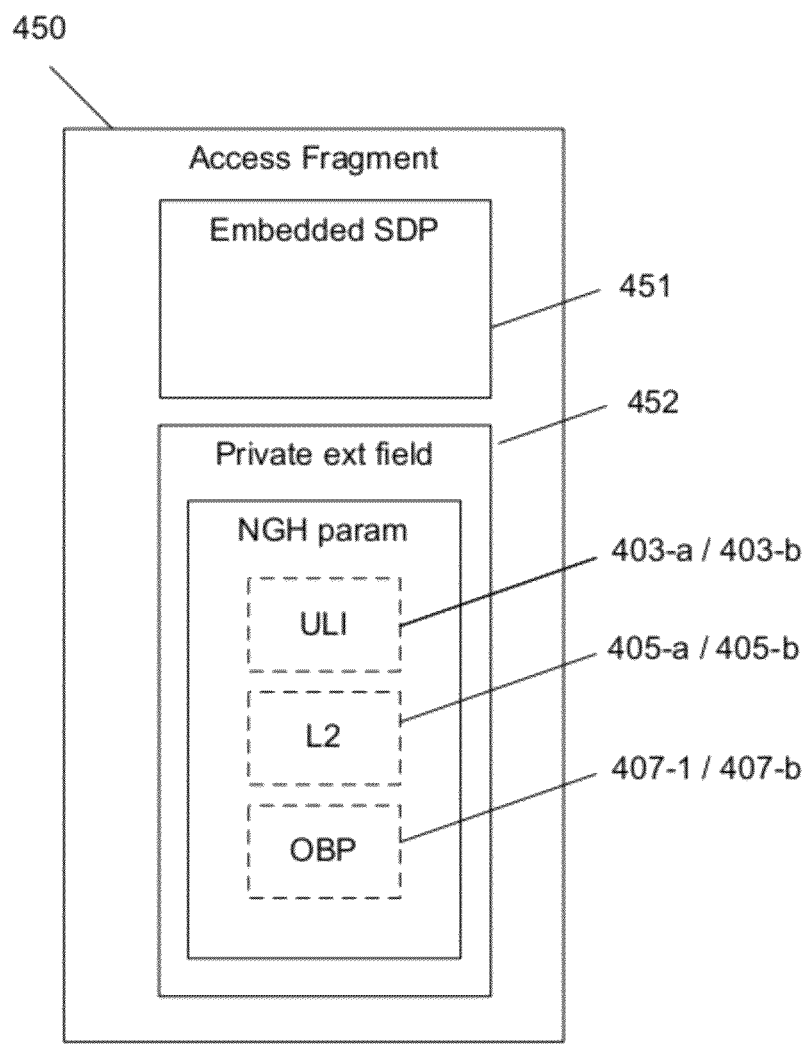

FIG. 4E illustrates another embodiment of signaling data (e.g., DVB-NGH signaling data) embedded within a private extension field 452 of an access fragment 450. The signaling data may be the same as in previous examples data (e.g., NGH parameters ULI 403-*a* and 403-*b*, L2 signaling parameters 405-*a* and 405-*b*, and other protocol signaling 407-*a* and 407-*b*). As previously discussed, access fragments describe how a client device may access a service and may include embedded SDP data 451 describing session description information for session initiation of a service. As further described with respect to FIG. 6D below, the SDP data 451 may be referenced and used along with the NGH parameters for linking the service in the IP layer and upper layers down to the physical layer.

Figure 4F:
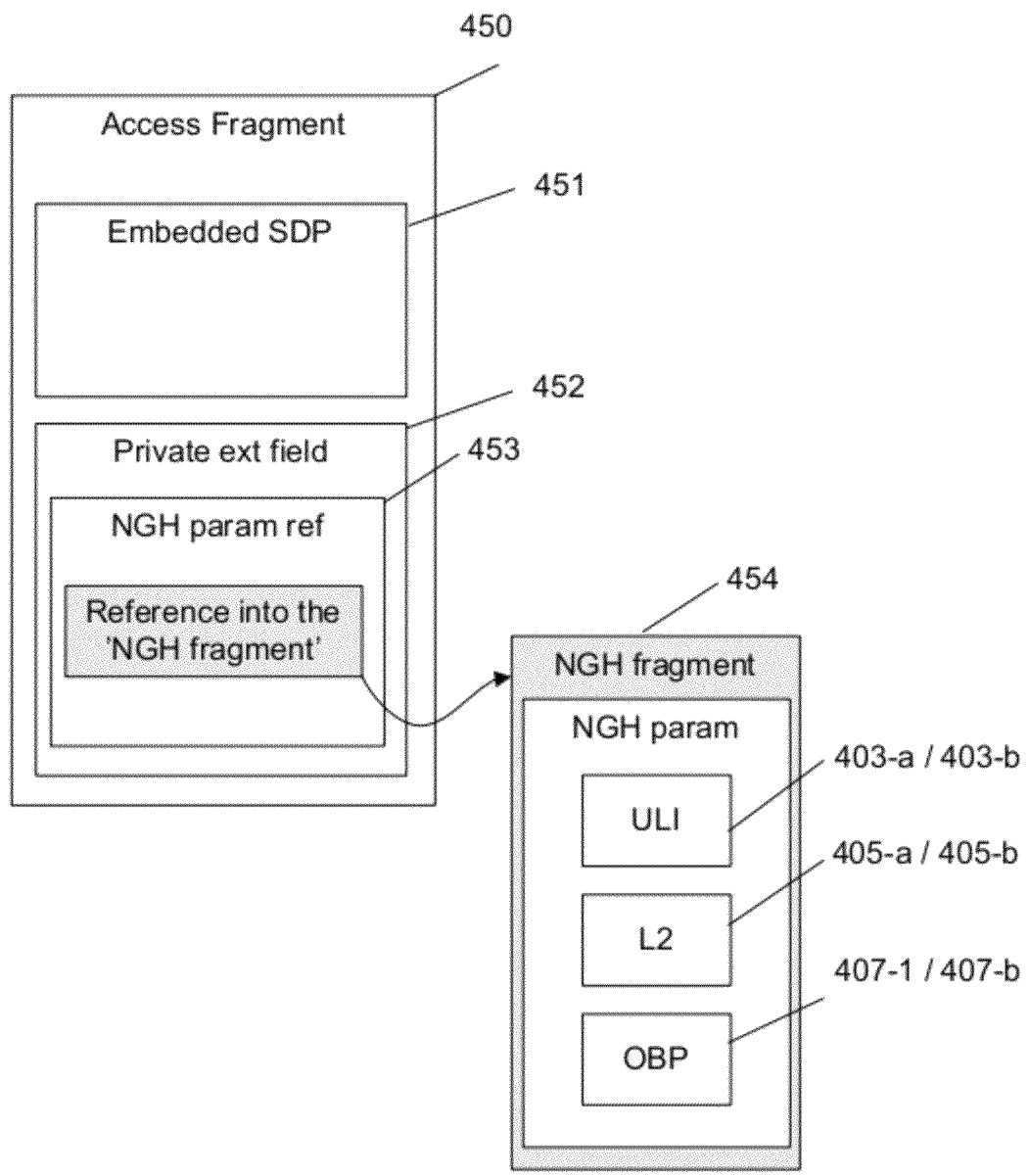

FIG. 4F illustrates another embodiment of an access fragment 450 having embedded SDP data 451. In this embodiment, the private extension field 452, includes references to one or more other fragments 454 that include the signaling data (e.g., NGH parameters ULI 403-*a* and 403-*b*, L2 signaling parameters 405-*a* and 405-*b*, and other protocol signaling 407-*a* and 407-*b*). In one variation, the references 453 are of the same format provided in the ESG data 441 of FIG. 4C, and the fragments containing the signaling data may be formatted in the same manner as the other ESG fragments contained within SGDUs. The ESG fragments including the signaling data may include other ESG data or may include only signaling data. The fragments containing only signaling data may include a unique identifier (e.g., URI="NGH_service1") by which the fragment may be identified and referenced. In another variation, the fragments containing only the signaling data may be of a different customized format tailored to the signaling data. As in FIG. 4E, the SDP data 451 in the access fragment may be referenced and used along with the NGH parameters in the signaling fragment 454 for linking the service in the IP layer and upper layers down to the physical layer.

Figure 4G:
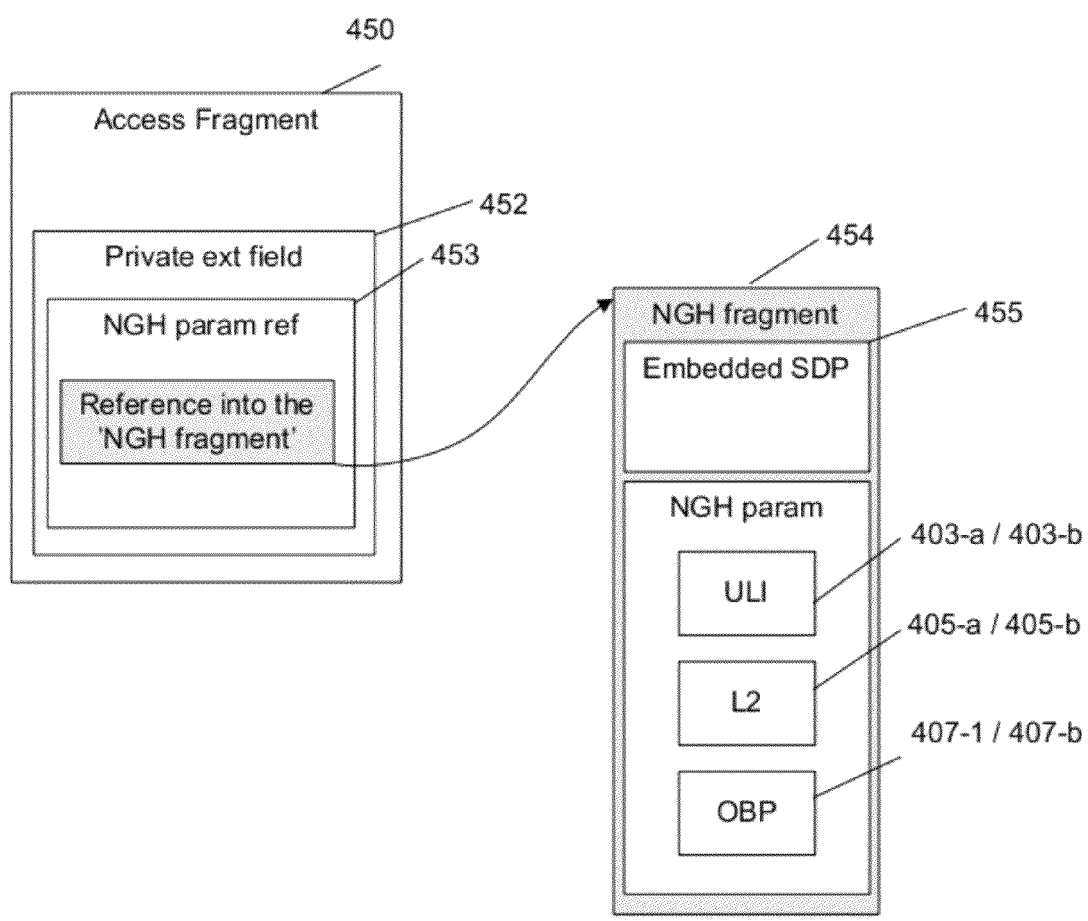

FIG. 4G illustrates an alternate embodiment similar to the embodiment of FIG. 4F, except that the signaling fragment 454 includes the embedded SDP 455 instead of the access fragment. In one variation, both the access fragment 454 and the signaling fragment 450 include embedded SDP data. In certain variations, the embedded SDP data 455 includes session description data for only those services and components which are identified in the signaling data (e.g., NGH parameters ULI 403-*a* and 403-*b*, L2 signaling parameters 405-*a* and 405-*b*, and other protocol signaling 407-*a* and 407-*b*).

Other embodiments may include different combinations of the data and fragments illustrated in FIGS. 4C-4G, and may include separate session description fragments including embedded SDP data, which may be referenced by the SGDDs, access fragments, and signaling fragments (e.g., NGH fragments).

Figure 5:
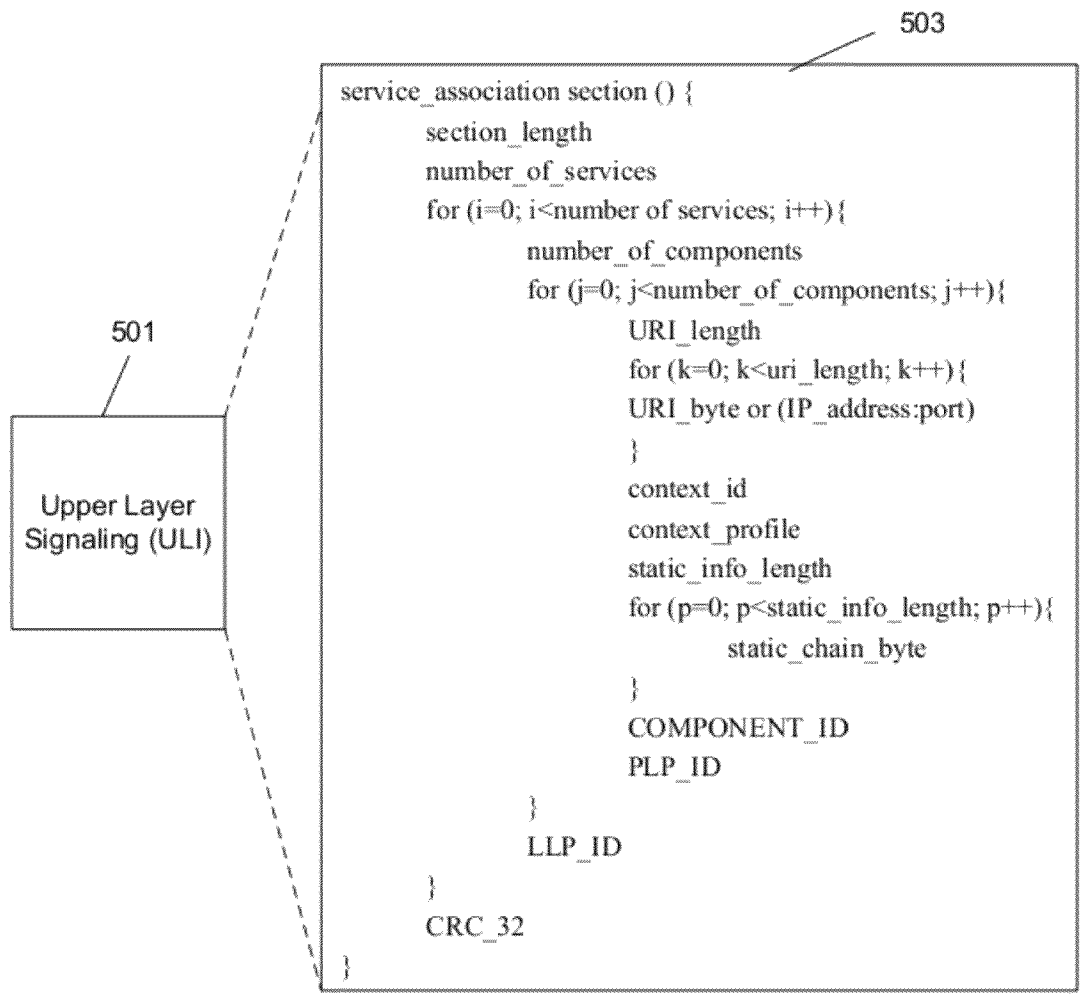
FIG. 5 depicts an example signaling structure for upper layer signaling in accordance with the examples shown in FIGS. 4A and 4B.

With respect to the upper layer information (ULI) of the illustrated example protocol stacks (e.g., ULI 403-*a* of FIG. 4A and ULI 403-*b* of FIG. 4B), the ULI can include information that maps services into the component identifiers for the services. Additionally, the upper layer information may include ESG specific signaling information and/or other upper layer transmission protocol data, such as data of protocols defined in OMA-BCAST ESG and/or DVB IPDC. Additionally, the ULI may include information that maps services into component identifiers for the services and provides Robust Header Compression (RoHC) information for each data stream. FIG. 5 depicts one example of a ULI signaling structure for service/component mapping in accordance with the example protocol stacks of FIGS. 4A and 4B. As illustrated in FIG. 5, upper layer information 501 (e.g., 403-*a*, 403-*b*) is represented by service_association section 503. Some embodiments of service_association section 503, as shown in FIG. 5, may incorporate a nested sequence of data elements that is represented by the loop pseudocode of FIG. 5. Other embodiments may incorporate a simplified structure in which the upper layer information 501 is represented by a section that is pre-defined (e.g., predefined length and section structure). In some embodiments, service_association section 503 may be a table and/or a part of a table, and may include information related to the table, such as a table identifier, table section information (e.g., a section length parameter), a table version number, a table section number, a previous section number, other data flags (e.g., a flag indicating whether the currently applicable table is the current or next version of the table), etc.

Referring to the information included within the service_association section 503, a section_length parameter may be a field (e.g., a 32 bit field) that indicates the length of the service association section and a number_of_services parameter may be a field (e.g., a 8 bit field) indicating the number of services delivered through the current channel (i.e., multiplex). The number_of_services may be used for indicating the number of iterations for the loop that is located in the example service_association section 503 between number_of_services and CRC_32.

Each service may include one or more components, and the number_of_components parameter may be a field (e.g., 8-bit field) used to indicate the number of components delivered through the corresponding service in that service loop. The number_of_components parameter may be used for indicating the number of iterations for the loop that is located in the example service_association section 503 between number_of_components and LLP_ID.

For each component of each service, a resource length parameter (e.g., URI_length) may be a field (e.g., 8 bit field) used for indicating the length of the URI for that service/component. The URI_length may be used to indicate the number of iterations for the loop that is located in the example service_association section 503 between URI_length and context_id, for retrieving the URI_byte or (IP_address:port) parameter(s).

The URI_byte or (IP_address:port) parameter(s) may be a string of one or more bytes (e.g., text bytes), which indicate the URI or number sequence (e.g., IPv4/IPv6 address and port number) for locating the service/component of that particular loop iteration.

In addition to the URI location identifier string, a number of other parameters are provided for each service/component to support RoHC decompression. These may include a context_id parameter indicating the context id of the RoHC compressed IP stream, the context_profile parameter indicating context profile of the compressed IP stream, the static_info_length parameter indicating the length of the static chain byte sequence, and the static_chain_byte parameter, which may be a byte sequence indicating the static information of the compressed IP stream.

For each component of each service, a PLP_ID parameter may be a field (e.g., 8 bit field) identifying uniquely the physical layer pipe through which the corresponding component is delivered. Similarly, for each service, a LLP_ID parameter may be a field (e.g., 16-bit field) identifying uniquely one logical layer pipe within network for the corresponding service. Each component may further include a COMPONENT_ID field (e.g., 32 bit field), which may identify the component within a session, and may correlate to a session description of the service formatted in SDP within the ESG (as further described with respect to FIG. 6*d*).

A cyclic redundancy check (CRC) parameter (e.g., CRC_32) may contain a CRC value for performing a redundancy check. In one example, CRC_32 may be a 32-bit field that contains the value that gives a zero output of the registers in the CRC decoder.

Figure 6A:
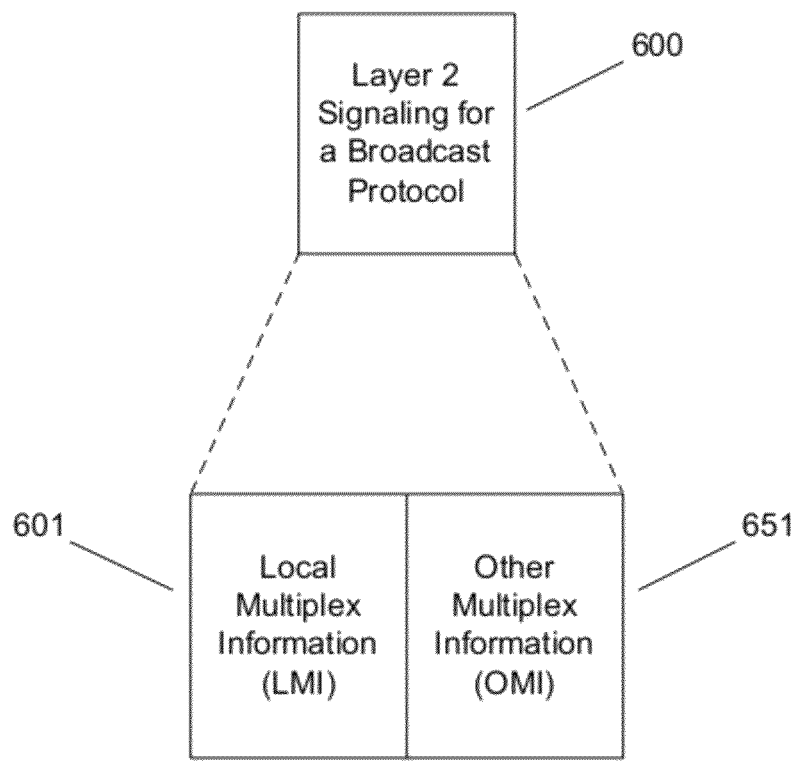
FIGS. 6A-6D depict example signaling structures for upper level and layer 2 signaling data in accordance with the examples shown in FIGS. 4A and 4B.

With respect to the L2 signaling data for a broadcast protocol of the illustrated example protocol stacks (e.g., DVB-NGH), the L2 signaling data can include data related to local multiplex information and other multiplex information. The L2 signaling data may include information that maps between services and multiplex information. In some embodiments, the included information may be similar to the information of PSI/SI signaling. Traditionally, PSI/SI signaling is carried with OSI Layer 2 information. In contrast to PSI/SI signaling, in some embodiments, the L2 signaling data may be carried within the ESG in OSI layers 3 and above. FIG. 6A illustrates an example detailed view of L2 signaling data in accordance with the example protocol stacks of FIGS. 4A and 4B. As illustrated in FIG. 6A, the L2 signaling data 600 (e.g., L2 signaling data 405-*a* of FIGS. 4A and L2 signaling data 405-*b* of FIG. 4B) may be divided into local multiplex information (LMI) 601 and other multiplex information (OMI) 651. LMI 601 may include information that maps the LLP identifiers (e.g., LLP_ID) to the PLP identifiers (e.g., PLP_ID) of the current multiplex (i.e., the multiplex being received in the currently received signal). In addition, the local multiplex information may provide information about the buffer model of the associated LLP. OMI 651 may include information that maps component identifiers, PLP identifiers and LLP identifiers with the multiplexes available within neighboring cells or other multiplexes.

Figure 6B:
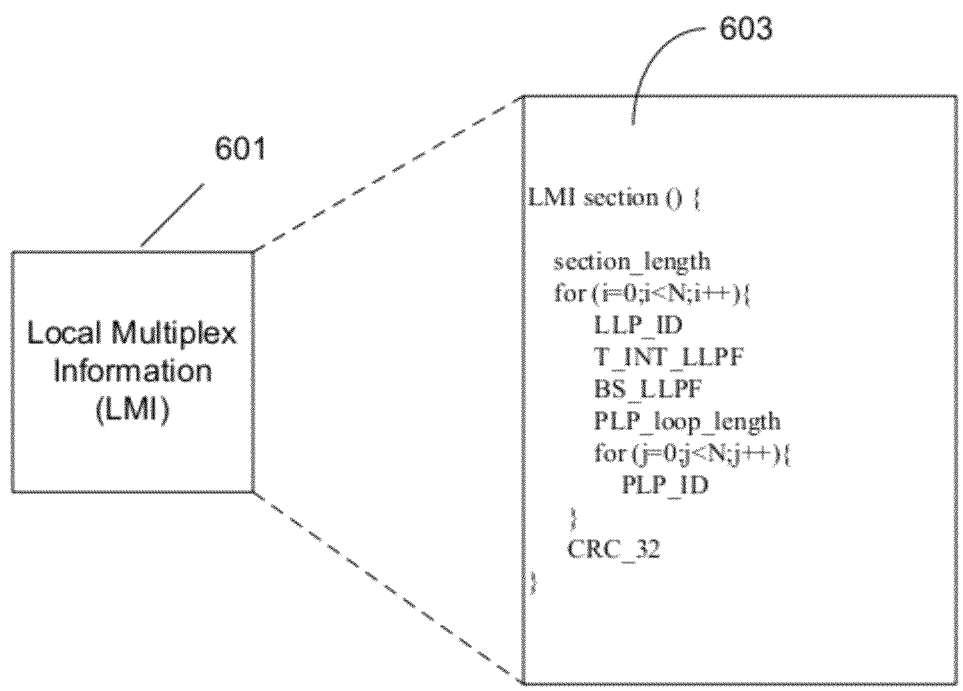

FIG. 6B illustrates an example signaling structure for local multiplex information in accordance with the example L2 signaling data of FIG. 6A. As illustrated in FIG. 6B, local multiplex information 601 is represented by LMI section 603. Some embodiments of LMI section 603, as shown in FIG. 6B, may incorporate a nested sequence of data elements that is represented by the loop pseudocode of FIG. 6B. Other embodiments may incorporate a simplified structure in which local multiplex information 601 is represented by a section that is pre-defined (e.g., predefined length and section structure).

Referring to the information included within the LMI section 603, a section length parameter (e.g., section_length) may be used for indicating a length of the sub-section that is located in the example LMI section 603 between section_length and CRC_32. In one example, section_length may indicate the number of LLPs, which is the number of iterations, N, of the loop following the section_length parameter. In another example, section_length may indicate the entire length of the section, including all possible loops.

A LLP identifier parameter (e.g., LLP_ID) may be used to identify each LLP. In one example, each LLP has a corresponding LLP_ID.

A time interval parameter (e.g., T_INT_LLPF) may be used to indicate the time between LLP frames in a transmission (e.g., milliseconds, OFDM symbols).

A maximum size parameter (e.g., BS_LLPF) may be used to indicate the size of the largest frame within an LLP.

A PLP loop length parameter (e.g., PLP_loop_length) may be used for indicating the number of iterations of the loop that is located in the example LMI section 603 beginning after PLP_loop_length.

A PLP identifier parameter (e.g., PLP_ID) may be used to identify each PLP grouped within the LLP of that LLP_ID iteration. In one example, each PLP has a corresponding PLP_ID.

A cyclic redundancy check (CRC) parameter (e.g., CRC_32) may contain a CRC value for performing a redundancy check. In one example, CRC_32 may be a 32-bit field that contains the value that gives a zero output of the registers in the CRC decoder.

Figure 6C:
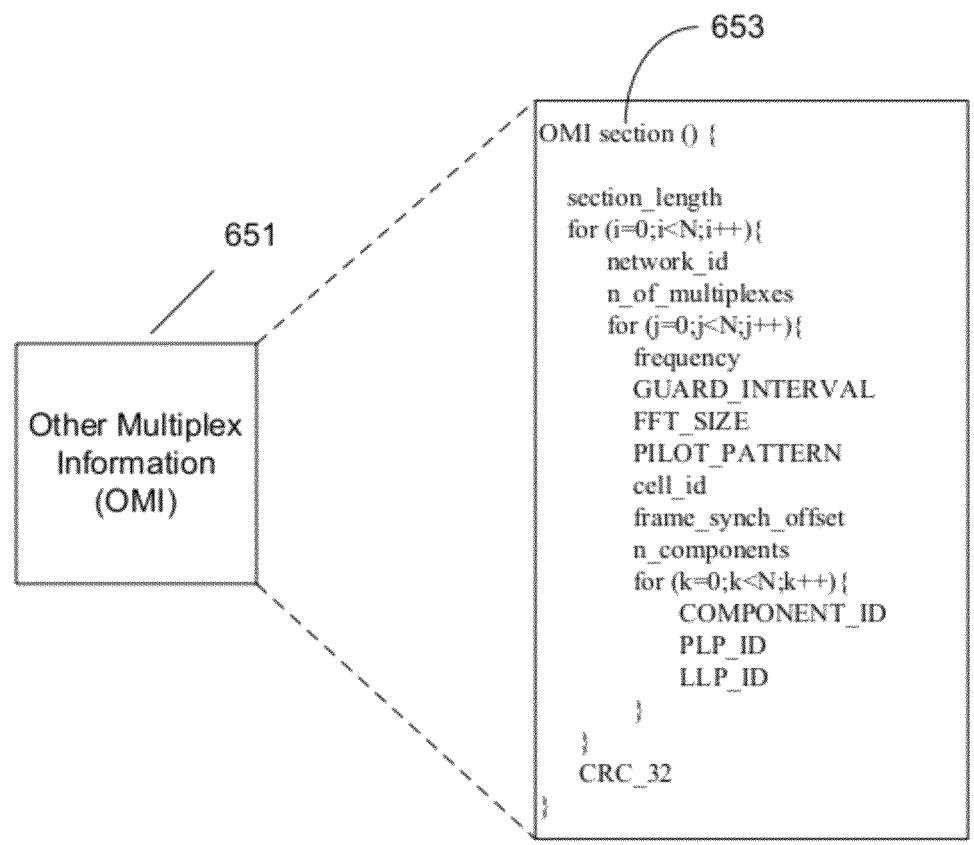

FIG. 6C illustrates an example signaling structure for other multiplex information 651 in accordance with the example L2 signaling data of FIG. 6A, OMI 651 lists components carried within the local multiplex, which are also available within other multiplexes located within signals adjacent to the currently received signal. As illustrated in FIG. 6C, other multiplex information 651 is represented by OMI section 653. Some embodiments of OMI section 653, as shown in FIG. 6C, may incorporate a nested sequence of data elements that is represented by a loop pseudocode as shown. Other embodiments may incorporate a simplified structure in which local multiplex information 651 is represented by a section that is pre-defined (e.g., predefined length and section structure).

Referring to the information included within the OMI section 653, a section length parameter (e.g., section_length) may be used for indicating a length of the sub-section that is located in the example OMI section 653 between section_length and CRC_32. In one example, section_length may indicate the number of neighboring networks, which may be the number of iterations of the loop following the section_length parameter. In another example, section_length may indicate the entire length of the section, including all possible loops.

A network identifier (e.g., network_id) may be used for uniquely identifying a network, such as a network associated with a neighboring cell.

A number of multiplexes parameter (e.g., n_of_multiplexes) may be used for indicating the number of iterations for the loop that is located in the example OMI section 653 beginning after n_of_multiplexes. In one example, n_of_multiplexes is dependent on the number of multiplexes (e.g., signals) available.

A frequency field (e.g., frequency) may be used for indicating a frequency of the signal carrying the associated multiplex for that iteration of the loop. The associated multiplex may be in a signal covering an area of the neighboring cell. The indicated frequency may be the channel center frequency.

A guard interval field (e.g., GUARD_INTERVAL) may be used for indicating the guard interval of the current superframe of the associated multiplex (e.g., signal).

A fast Fourier transfer (FFT) size parameter (e.g., FFT_SIZE) may be used for indicating the FFT size (e.g., 2K, 8K, etc.) of the current frame type in the associated multiplex. The multiplex may include also other types of frames, for example, future extension frames, which may have a different FFT size.

A pilot pattern parameter (e.g., PILOT_PATTERN) may be used for indicating the pilot pattern of the signal. In one example, PILOT_PATTERN indicates the scattered pilot pattern used for the data Orthogonal Frequency Division Multiplexing (OFDM) symbols of the associated multiplex.

A cell identifier (e.g., cell_id) may be used for identifying a cell. In one example, each cell may be unique within one network.

A frame offset parameter (e.g., frame_synch_offset) may be used for indicating the frame offset between the physical layer frame transmitted within the current multiplex (e.g., the multiplex the receiving device is currently receiving) and the physical layer transmitted within the associated multiplex (e.g., a multiplex of the neighboring cell).

For each associated multiplex, a parameter indicating a number of services/components for that multiplex (e.g., n_components) may used to indicate the number of iterations for the loop following n_components. For each service/component within the loop, an identification parameter (e.g., COMPONENT_ID) may be used for providing an indexed identification for services/components within the current and neighboring multiplexes. The COMPONENT_ID may be unique in each multiplex, and thus may be reused for identifying the current and adjacent services/components. Using COMPONENT_ID may advantageously reduce the needed signaling capacity, since a COMPONENT_ID may be shorter than the corresponding unique resource identifier. For each service/component, a LLP and PLP are identified with LLP_ID and PLP_ID.

Figure 6D:
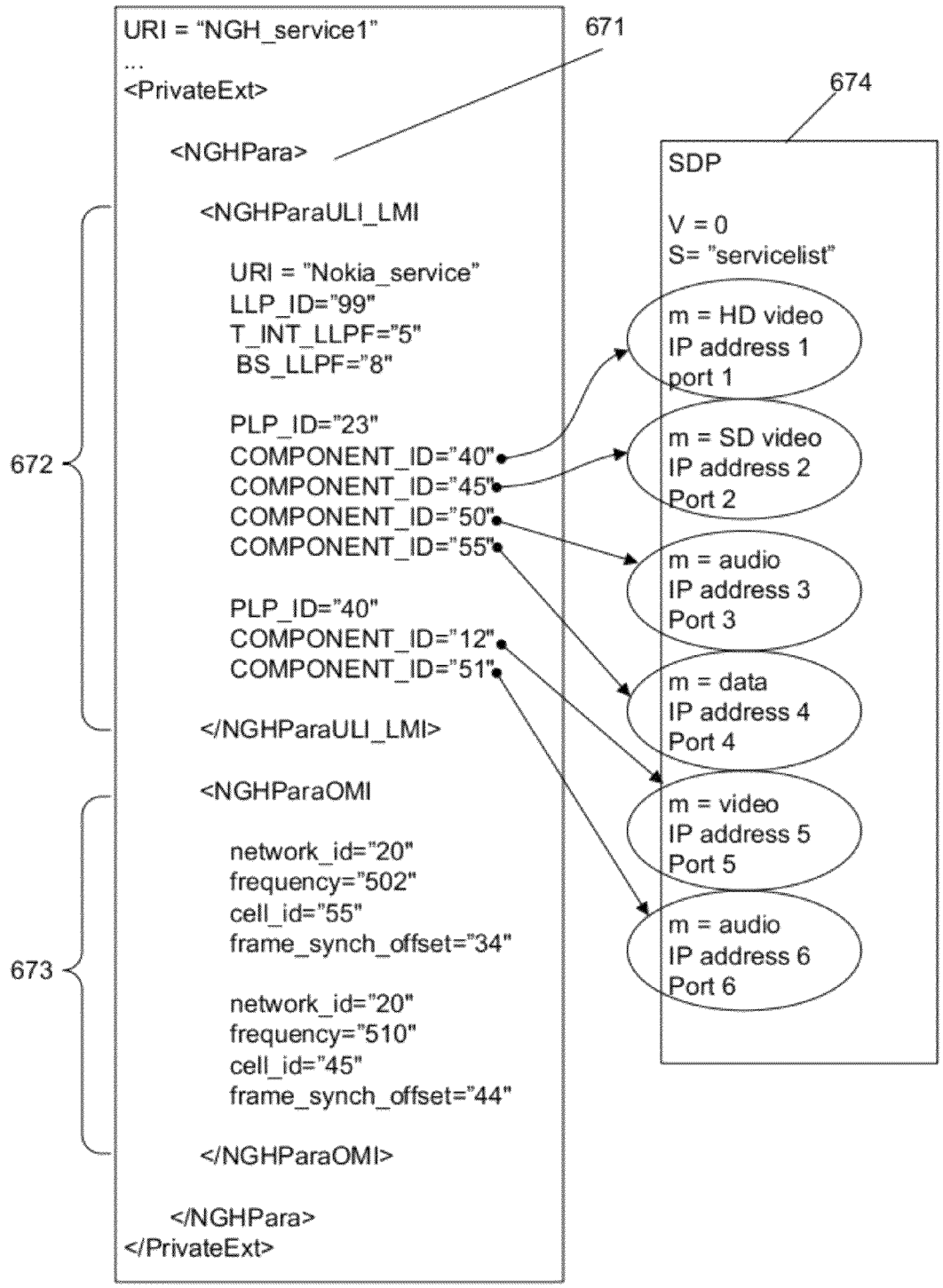

FIGS. 6A, 6B, and 6C illustrate one format of signaling data. Other embodiments may format the signal data in other manners depending on the application. For example, FIG. 6D illustrates another example of signaling data carried within the SGDD and/or fragments as illustrated in FIGS. 4C-4G. If the signaling data is within a fragment, the fragment may be identified with a URI, such as URI="NGH_service1." The signaling data is organized into one NGHPara section 671, which carries the same ULI, LMI, and OMI data illustrated in FIGS. 5, 6B, and 6C for one service identified by the URI parameter within the NGHPara section 671 (e.g., URI="Nokia_service"). Section 671 may be within a private extension field of a fragment or SGDD. The selection of parameters listed in section 671 is illustrative only, and certain parameters may be added or subtracted as required by the service and protocol requirements. Multiple instances of NGHPara may be included to identify and describe multiple services respectively. NGHPara includes two subsections.

The first subsection 672, labeled NGHParaULI_LMI includes signaling data similar to the data described with respect to FIGS. 5 and 6B. Below the URI parameter, which identifies the service, the LLP identifier parameter (e.g., LLP_ID) may be used to identify each LLP associated with the service. In this example, only one LLP is identified, although more than one LLP may be associated and identified per service. A time interval parameter (e.g., T_INT_LLPF) may be used to indicate the time between LLP frames in a transmission (e.g., milliseconds, OFDM symbols). A maximum size parameter (e.g., BS_LLPF) may be used to indicate the size of the largest frame within an LLP.

Every LLP identified is associated with one or more PLPs identified by PLP_IDs (e.g., PLP_ID="23", PLP_ID="40"). For every PLP, a set of elements carried in the PLP and associated with the service are identified by unique COMPONET_IDs. In the example of FIG. 5, the signaling data also identifies location information such as a IP address/port for locating each component. In the example of FIG. 6D, already existing ESG data may be leveraged to provide the same location and other information for the components as in FIG. 5. As previously discussed, the ESG may include session description information, which may be formatted according to the Session Description Protocol (SDP). Example SDP formatted information is shown as 674. The SDP data includes a number of entries. Those entries tagged with an "m=" identify a media component and address for accessing the media component. The examples illustrated in SDP data 674 are multimedia components, but other types of components may be included. The SDP data may be included in various locations within the ESG, such as in access fragments, session description fragments, or in fragments dedicated to carrying signaling data. Examples of SDP data locations are included in FIGS. 4E, 4F, and 4G.

In the example of FIG. 6D, each COMPONENT_ID is associated with a media component in the SDP data by the order in each file (i.e., the first COMPONENT_ID listed in 671 is associated with the first media component entry in the SDP data 674). While this example utilizes SDP data, other ESG data may be used, such as MBMS User Service Bundle Description data (MBMS-USBD), as defined in standard 3GPP TS 26.346 or as defined by some other standard. By utilizing the data already in the ESG, the signaling data may be reduced. Carrying the signaling data within the ESG further adds efficiency in accessing the shared signaling/ESD data. In various embodiments, the signaling data and SDP data may be located in a common ESG fragment as illustrated in FIGS. 4E and 4G. For example signaling data 671 in FIG. 6D may be the signaling data in the private extension field 452 of access fragment 450 in FIG. 4E, and the SDP data 674 in FIG. 6D may be the embedded SDP data 451 in access fragment 450 of FIG. 4E. Such a configuration has an advantage in that all of the information required to link a service from upper level layers down to the physical layer may be found by receiving and decoding one fragment, which greatly improves system efficiency and avoids fragmentation issues of having signaling data spread across several layers. In various embodiments the access fragment and SDP data may be compatible with the OMA BCAST ESG standard over DVB-H, and the signaling data may be formatted according to the DVB-NGH standard.

Subsection 673 in FIG. 6D is labeled as NGHParaOMI and is similar to the OMI data illustrated in FIG. 6C. The NGHParaOMI subsection identifies neighboring frequencies carrying the same service identified by the URI parameter. The service may be carried on a number of neighboring frequencies, and thus a number of neighboring frequencies may be identified in NGHParaOMI. The NGHParaOMI section may include, for each neighboring frequency carrying the service, a network identifier (e.g., network_id), which may be used for uniquely identifying a network, such as a network associated with a neighboring cell. A frequency field (e.g., frequency) may be used for indicating a frequency of the signal carrying the associated multiplex carrying the service identified by the URI paramenter. The associated multiplex may be in a signal covering an area of the neighboring cell. The indicated frequency may be the channel center frequency. A cell identifier (e.g., cell_id) may be used for identifying a cell. In one example, each cell may be unique within one network. A frame offset parameter (e.g., frame_synch_offset) may be used for indicating the frame offset between the physical layer frame transmitted within the current multiplex (e.g., the multiplex the receiving device is currently receiving) and the physical layer transmitted within the associated multiplex (e.g., a multiplex of the neighboring cell). Other parameter such as a guard interval, an FFT size parameter, and a pilot parameter as described with respect to FIG. 6C may also be included.

As previously discussed, the ESG is delivered in fragments in SDGUs, which are mapped by one or more SGDDs. Further, the signaling data may be in a fragment in the SDGUs or in the SGDDs. In order to assemble and access the ESG, and thus the embedded signaling, the SGDD must first be retrieved and decoded before any of the fragments and signaling data may be retrieved. To aid in this process, the SGDDs may delivered in one or more dedicated transport sessions, which may be identified as a service guide announcement channel. The service guide announcement channel may be a transport session, such as a FLUTE session for delivering the SGDDs. The broadcast system may provide the signaling for the service guide announcement channel in a number of ways. For example, the announcement channel may be addressed to a predetermined multicast IPv4 or IPv6 address/port, which is shared a priori with the client devices. Other signaling requirements for receiving the SGDD may also be provided and defined by the broadcast system. In another variation in an interactive channel, a URL may be provided, which resolves to a session description, which describes the file distribution session (e.g., FLUTE session) carrying the announcement information. In this way, the client device may send a request for the information to the URL. In some variations, the URL may be discovered using a DNS query to a DNS server. The queried name may be predetermined to identify the file delivery session carrying the SGDD.

Figure 7:
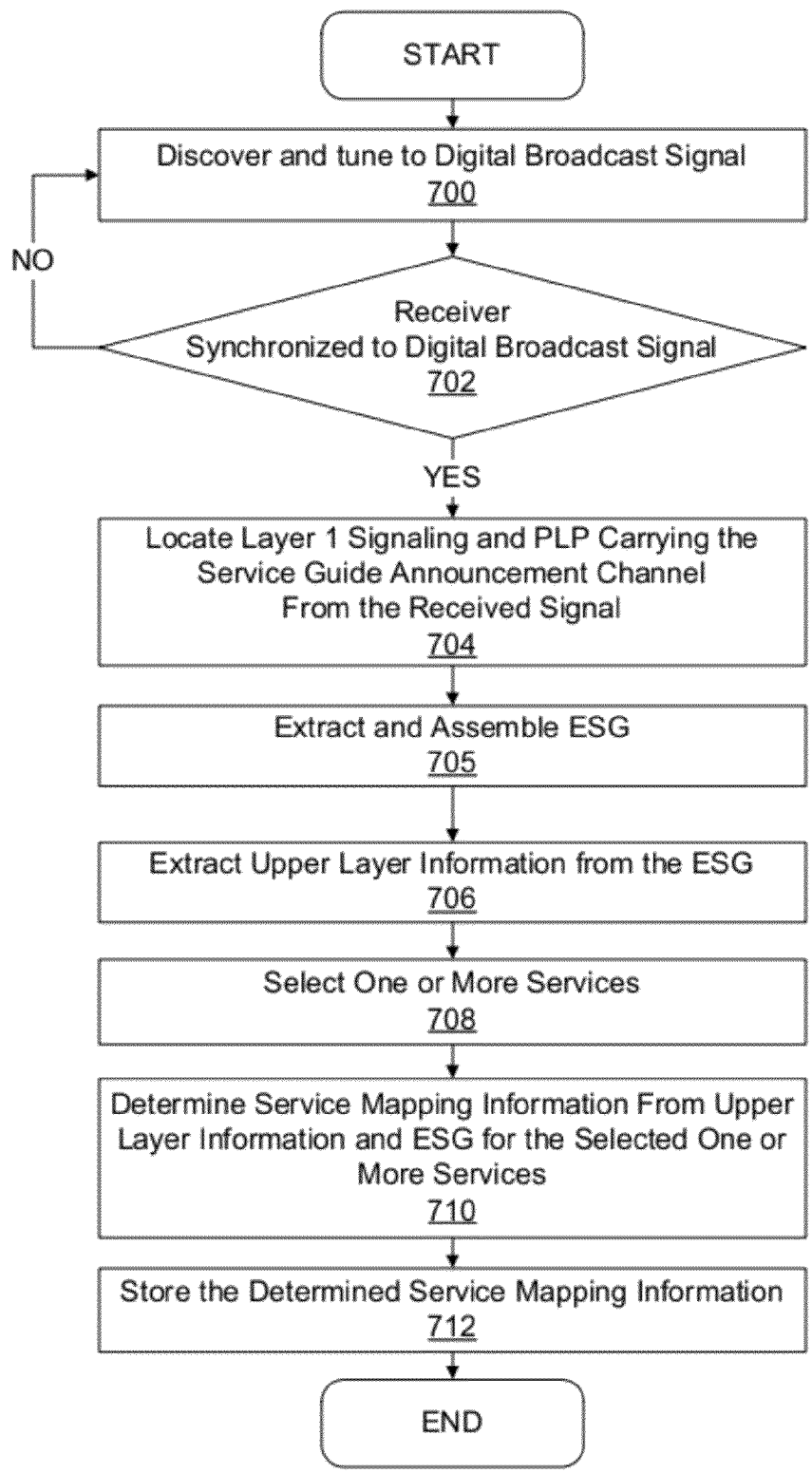
FIG. 7 illustrates an example method for processing layer 1 signaling and upper layer information according to one or more embodiments described herein.
Figure 8:
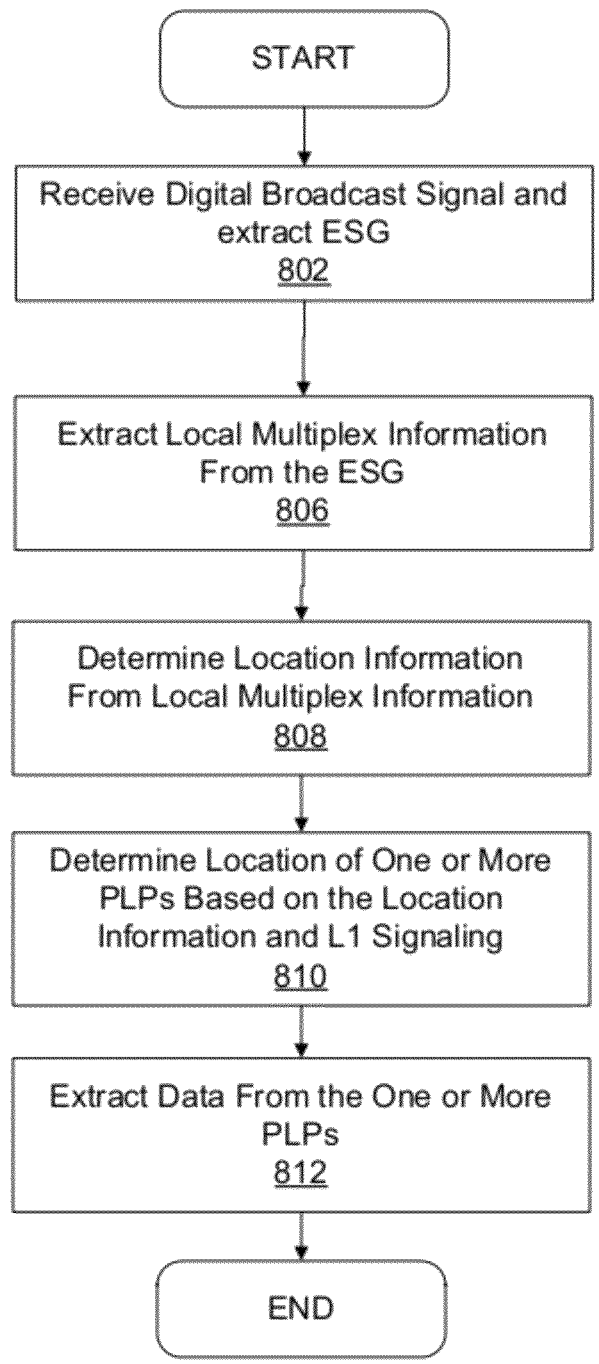
FIG. 8 illustrates an example method for processing local multiplex information according to one or more embodiments described herein.

To locate the PLPs carrying data for consumption at an electronic device (e.g., video and/or audio components of a service for viewing, playback, etc.), processing of signaling parameters included in the upper layer information and local multiplex information may be performed. FIGS. 7 and 8 illustrate example methods for processing the upper layer information and local multiplex information, respectively. The methods may be implemented, for example, by a processor or other element in a receiving device, such as, but not limited to, mobile communication device 105, mobile phone 110, personal digital assistant (PDA) or mobile computer 120, and personal computer (PC) 115 depicted in FIG. 1A. The receiving device may begin processing the signaling data by performing the example process illustrated in FIG. 7.

FIG. 7 illustrates an example method for processing layer 1 signaling and upper layer information. At steps 700 and 702, a digital broadcast signal (e.g., a DVB-NGH signal) may be received, by first discovering and tuning to the broadcast signal in step 700, and then determining if the receiver is synchronized to the broadcast signal in step 702. If the receiver is not synchronized, step 700 is repeated. If the receiver gets synchronization, then at step 704, the layer 1 (L1) signaling and PLP carrying the service guide announcement channel may be located from the received signal. Upon locating the L1 signaling and the PLP carrying the service guide announcement channel, the L1 signaling and one or more SGDDs may be decoded from the signal.

In step 705, based on the SGDDs, the Electronic Service Guide is extracted and assembled. In some variations, the entire ESG is assembled, and in other variations, the ESG is only assembled to the extent needed to retrieve the upper layer signaling. For example, if the upper layer signaling is appended to the SGDD, in some cases only the SGDD need be assembled. In other variations, such as the one illustrated in FIG. 6D, SDP data within the ESG is also needed to extract the ULI, and thus more of the ESG must be extracted and assembled. In another variation, if the SDP and signaling data are collated in one access fragment as illustrated in FIG. 4E, only the access fragment need be received. At step 706, the ULI may be extracted from the ESG data. In some instances, this can include separating the ULI from the additional signaling information included in the ESG carrying the ULI. In some variations, the ULI is extracted from the SGDD. In other variations, the ULI is extracted from an ESG fragment, such as an access fragment, which may be identified in the SGDD or by another ESG fragment.

At step 708, one or more services (e.g., the one or more desired services) may be selected. In one example, a service may be selected (e.g., by a user of the receiving device via a user interface or autonomously by an application executed by the receiving device). A service identifier (e.g., a URI) for the selected service may then be discovered. For example, a receiver may analyze ESG information assembled in step 705 and stored at the receiver to identify a URI for a desired service.

At step 710, service mapping information for the selected one or more services may be determined from the upper level information. For example, the upper level information (e.g., the service_association section 503 of FIG. 5, NGHParaU-LI_LMI of FIG. 6D) may be processed and/or decoded to determine the component parameters (e.g., URIs, LLP_IDs and PLP_IDs of FIG. 5) of the selected one or more services. For example, the PLP_IDs may be associated with the identified URI for the desired service(s) in the ESG. In one instance, the component parameters are identified by locating a component identifier field (e.g., COMPONENT_ID, not shown in FIGS. 5 and 6D) associated with a matching URI included in the upper level information. Each URI may be associated with one or more component identifiers (e.g., an identifier for each component of the desired service). In some embodiments, each desired service may be associated with one or more components respectively transporting audio data, video data, text data, etc. Each URI may be associated with a similar number of component identifiers. Referring to the service_association section 503 of FIG. 5, a matching URI may be located in the service_association section 503 by locating a string of URI bytes that match the desired URI. The matching URI may similarly be found in the NGHParaU-LI_LMI section of FIG. 6D. Referring again to step 710 of FIG. 7, as another example of service mapping information, the upper level information may be processed and/or decoded to determine LLP identifiers (e.g., LLP_IDs of FIGS. 5 and 6D) associated with the PLP_IDs.

At step 712, the determined mapping information (e.g., the component parameters determined in step 710) may be stored (e.g., in a memory of the receiving device) for later access.

Upon retrieving and/or storing the service mapping information, the receiving device may continue processing the signaling data by performing the example process illustrated in FIG. 8.

FIG. 8 illustrates an example method for processing local multiplex information (LMI). At step 802, a digital broadcast signal (e.g., a DVB-NGH signal) may be received and the ESG extracted and assembled (e.g., as in steps 700 through 705 of FIG. 7).

At step 806, the LMI may be extracted from the ESG. Similar to extraction of the ULI, in some instances, this can include separating the LMI from the additional signaling information included in the ESG (e.g., separating the LMI from the ULI). In some variations, the LMI is extracted from the SGDD (e.g., FIG. 4C). In other variations, the LMI is extracted from ESG fragments, such as an access fragment, which may be identified in the SGDD or by another ESG fragment (e.g., FIG. 4D). In yet other variations, the LMI is extracted from the SGDD along with additional information from the ESG (e.g., SDP data in FIG. 6D) or from an ESG fragment along with SDP data (e.g., FIGS. 4E and 4G).

At step 808, location information may be determined from the extracted LMI section. For example, for each LLP_ID found in the last step of FIG. 7, the local multiplex information (e.g., the LMI section 603 of FIG. 6B and section 672 of FIG. 6D) may be processed and/or decoded to determine further related PLP identifiers (e.g., PLP_IDs of FIGS. 6B and 6D) corresponding to the selected one or more services (e.g., URIs, COMPONENTS_IDs determined in FIG. 7 from the ULI). In one instance, the PLP identifiers are identified by locating the PLP identifiers associated with a matching component identifier included in the local multiplex information.

As another example, for each LPL_ID stored in step 712 of FIG. 7, the local multiplex information may be processed and/or decoded to determine buffer information (e.g., T_INT_LLPF and BS_LLPF of FIG. 6B). In some embodiments, the buffer information may be identified from the LMI by locating the buffer information associated with a matching LLP identifier included in the LMI (e.g., an LLP_ID included in LMI section of FIG. 6B matching an LLP_ID determined in FIG. 7 from the ULI). In some embodiments, the location multiplex information (e.g., the buffer information and PLP identifiers) may be stored (e.g., in a memory of the receiving device) for later access.

At step 810, the location of one or more PLPs is determined based on the location multiplex information and L1 signaling. For example, the location multiplex information (e.g., the buffer information and PLP identifiers) and the L1 signaling (e.g., the L1 signaling extracted and stored in method illustrated by FIG. 7) may be used to identify the physical location of the PLP that corresponds to a component of the desired service(s). At step 812, upon locating the one or more PLPs, data of the desired service(s) from the one or more PLPs may be extracted and subsequently consumed (e.g., processed for viewing, playback, etc.) at the receiving device (or transmitted to another terminal for consumption at the terminal).

The receiving device may require a handover to be performed. In one example, the receiving device may initiate a handover from a first cell to a second cell. The receiver may attempt to continue receiving and/or consuming the desired service(s) currently being received and/or consumed by the receiving device. A handover procedure, in some embodiments, may include using information included in the other multiplex information (e.g., OMI 653 of FIG. 6A, OMI 673 of FIG. 6D).

Figure 9:
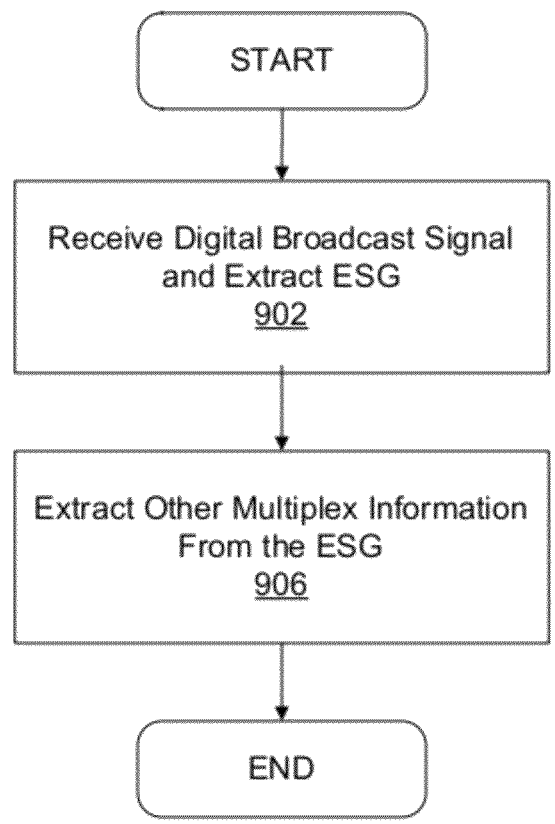
FIG. 9 illustrates an example method for processing other multiplex information according to one or more embodiments described herein.

FIG. 9 illustrates an example method for processing other multiplex information. At step 902, a digital broadcast signal (e.g., a DVB-NGH signal) and the ESG with the digital broadcast signal may be received in the same manner as in steps 700 and 705 of FIG. 7. At step 904, the PLP carrying the other multiplex information (OMI) may be located from the received signal.

At step 906, the OMI may be extracted from the ESG. Similar to the extraction of the ULI and/or the LMI, in some instances, this can include separating the OMI from the additional signaling information included in the ESG (e.g., separating the OMI from the ULI, LMI and/or other OMIs). In some variations, the OMI is extracted from the SGDD (e.g., FIG. 4C). In other variations, the OMI is extracted from ESG fragments, such as an access fragment, which may be identified in the SGDD or by another ESG fragment (e.g., FIG. 4E). In yet other variations, the OMI is extracted from the SGDD along with additional information from the ESG (e.g., SDP data in FIG. 6D).

In FIGS. 7, 8, and 9, the processing of the UMI, LMI, and OMI are illustrated as separate steps. In alternate embodiments, the processing of the UMI, LMI, and OMI may be combined.

Figure 10:
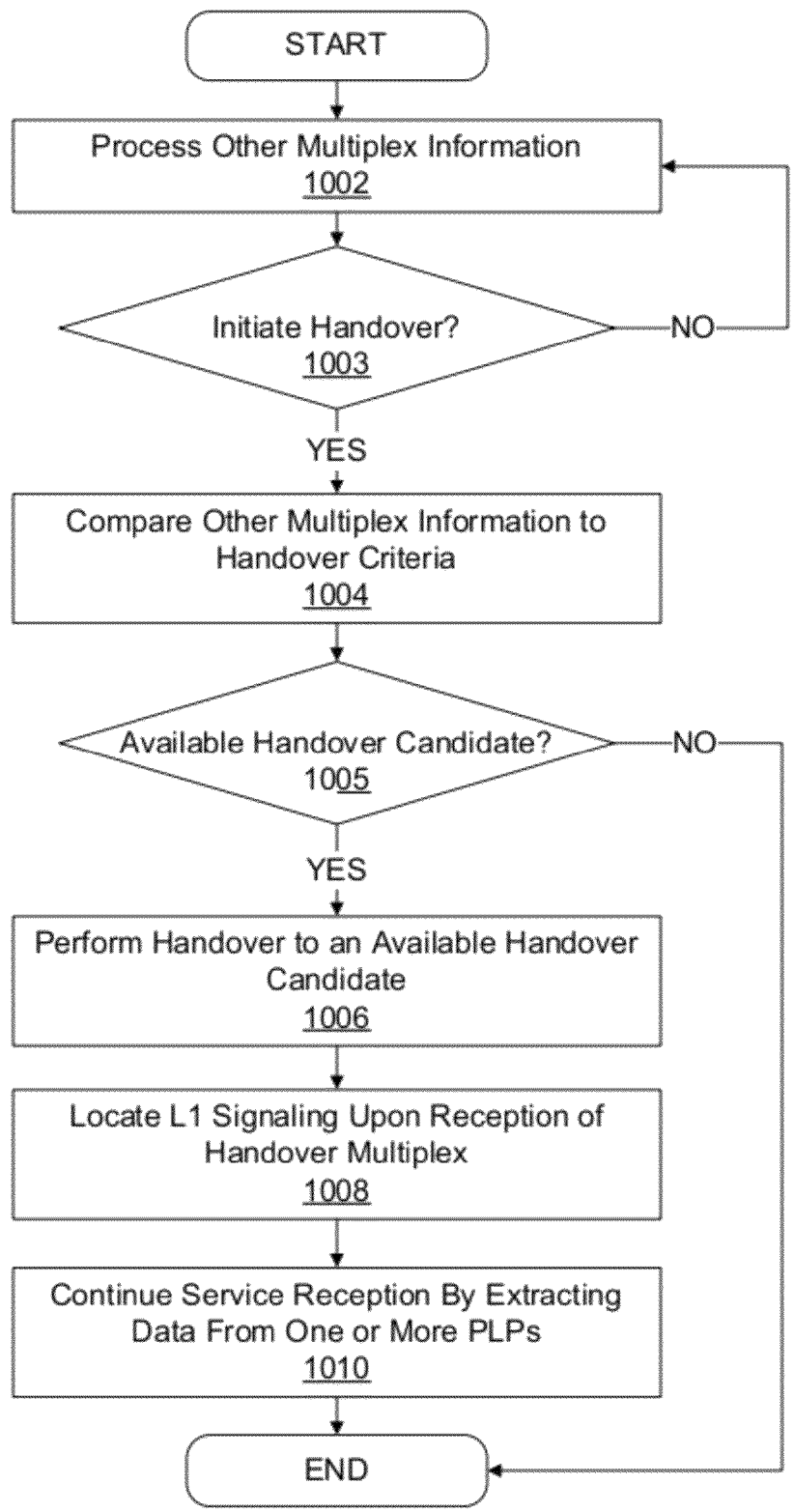
FIG. 10 illustrates an example method for performing a handover according to one or more embodiments described herein.

FIG. 10 illustrates an example method for performing a handover. At step 1002, the other multiplex information may be processed. In some embodiments, this may proceed in a manner that is the same or similar to the method illustrated in FIG. 9. At step 1003, a determination may be made whether to initiate a handover. In some embodiments, a handover may be initiated based on one or more thresholds being reached, such as a signal strength threshold. In one example, a handover may be initiated when the receiving device moves from a first cell to a second cell of the network. If it is determined to initiate a handover, the handover may be initiated and the method may proceed to step 1004. Otherwise, the method may proceed to step 1002, where OMI information may be processed again. Such re-processing may include updating OMI information with updated OMI information and/or extracting new OMI information. For example, a new digital broadcast signal may be received that includes updated OMI information. The updated OMI information may be extracted (e.g., similar to the method illustrated in FIG. 9) and/or stored for later access. In certain variations, the updating is based on an inspection of changes in transport object identifiers and version numbers of transport objects carrying the SGDUs and SGDDs carrying the OMI.

At step 1004, a handover has been initiated and the OMI may be compared to handover criteria. The OMI together with the ESG may list one or more (e.g., some or all) components carried within the current multiplex (e.g., the multiplex, or signal, the receiving device is currently tuned to) and/or other multiplexes (e.g., the multiplexes not currently tuned to, but available to the device, such as multiplexes of neighboring cells or other multiplexes of the current cell). In one example, each multiplex may be included in the OMI and may have a respective list of components that are carried within the multiplex. Components listed in the OMI may use the same component identifiers as the component identifiers found in the ULI and/or the LMI (e.g., COMPONENT_IDs).

In some embodiments, the handover criteria may be one or more services currently being received and/or consumed by the receiving device. Additionally and/or alternatively, the handover criteria may include one or more services recently received and/or consumed by the receiving device, and/or may include one or more services predicted to be received and/or consumed by the receiving device (e.g., a prediction based on reception and/or consumption habits of a user at the receiving device). These services may be represented in the handover criteria by their component identifiers. Comparing the OMI to the handover criteria may include identifying one or more multiplexes of the OMI that include a listing of component identifiers that match the component identifiers of the handover criteria. In one instance, one or more multiplexes of the OMI may be identified by the comparison against handover criteria representing the services currently being received and/or consumed by the receiving device. In this instance, these identified multiplexes carry the services currently being received and/or consumed by the receiving device.

In some embodiments, the comparison may compare the handover criteria to every multiplex included in the OMI. In others, the comparison may compare the handover criteria until a first matching multiplex is identified in the OMI. In yet others, the comparison may compare the handover criteria until a threshold number (e.g., 2, 3, 4, etc.) of matching multiplexes are identified in the OMI. Additionally, the information for the identified matching multiplexes may be extracted from the OMI and/or stored for later access. For example, referring to the OMI section 653 of FIG. 6C or section 673 of FIG. 6D, the various parameters associated with a particular matching multiplex may be extracted and/or stored. The extracted and/or stored parameters may include a network identifier (e.g., network_id of OMI section 653 of FIG. 6C and section 673 of FIG. 6D) of the matching multiplex, a frequency parameter (e.g., frequency of OMI section 653 of FIG. 6C and section 673 of FIG. 6D) of the matching multiplex, a guard interval parameter (e.g., GUARD_INTERVAL of OMI section 653 of FIG. 6C and section 673 of FIG. 6D) of the matching multiplex, a FFT size parameter (e.g., FFT_SIZE of OMI section 653 of FIG. 6C and section 673 of FIG. 6D) of the matching multiplex, a pilot pattern parameter (e.g., PILOT_PATTERN of OMI section 653 of FIG. 6C and section 673 of FIG. 6D) of the matching multiplex, a cell identifier (e.g., cell_id of OMI section 653 of FIG. 6C and section 673 of FIG. 6D) of the matching multiplex, a frame offset parameter (e.g., frame_synch_offset of OMI section 653 of FIG. 6C and section 673 of FIG. 6D) of the matching multiplex, the various component identifiers (e.g., COMPONENT_IDs of OMI section 653) of the matching multiplex, the various PLP identifiers corresponding to the component identifiers (e.g., PLP_IDs of OMI section 653 of FIG. 6C and section 673 of FIG. 6D) of the matching multiplex, and/or the various LLP identifiers corresponding to the component identifiers (e.g., LLP_IDs of OMI section 653 of FIG. 6C and section 673 of FIG. 6D) of the matching multiplex.

Referring again to FIG. 10, at step 1005, a determination is made whether there are any available handover candidate multiplexes. For example, if one or more multiplexes are identified in the OMI that match the handover criteria (e.g., there is at least one multiplex in the OMI that carries the services currently being received and/or consumed by the receiving device), it may be determined that there are available handover candidates. The process may then proceed to step 1006. Otherwise, the process may end and/or announce (e.g., present an indicator on a display, illuminate a lamp, produce a sound, etc.) that there are not any available candidates. Such an announcement may include announcing that handover is not possible and/or that service disruption would result if handover is performed.

At step 1006, the handover to an available handover candidate multiplex is performed. The handover may include selecting a handover multiplex from the available handover candidate multiplexes and starting reception of the handover multiplex. In some instances, the handover multiplex may be a different frequency than the current multiplex. Selecting the handover multiplex may be performed in various ways, including, for example: selecting the first available candidate multiplex; selecting based on multiplex priority (e.g., multiplexes having certain parameter and/or identifier values, such as network identifier and/or cell identifier, may be given priority over other multiplexes having different parameter/identifier values); and/or selecting based on other criteria (e.g., signal strength of the available multiplexes). The handover may be performed using the information of the selected handover multiplex that was extracted from the OMI (e.g., the parameters and/or identifiers extracted from OMI section 653 of FIGS. 6C and 673 of FIG. 6D). For example, a frame offset parameter may be used when starting the reception of a frame (e.g., a DVB-NGH frame) carried by the new multiplex. Use of the frame offset may, for example, enable the correct timing and/or prevent delay of the frame synchronization.

At step 1008, upon reception of a signal of the handover multiplex, the L1 signaling is located. The L1 signaling may then be extracted for use by the receiving device. In conjunction with the information for the handover multiplex extracted from the OMI (e.g., component identifiers, PLP identifiers, LLP identifiers, etc.), the L1 signaling may provide the receiving device the information needed locate and extract information from PLPs carrying the data for the desired services. In some embodiments, the receiving device may proceed immediately with locating and extracting information from the PLPs carrying the data for the desired services so that the receiving device may continue receiving and/or consuming the desired services. For example, there may be no need to locate and process ULI and LMI information (e.g., the example methods illustrated in FIGS. 7 and 8), and those processes may be skipped and/or not performed.

At step 1010, reception of the desired services may be continued by extracting data from one or more PLPs of the desired service from the received signal of the handover multiplex. Extracting the data may include locating the one or more PLPs using the L1 signaling located in step 1008 and the information of the handover multiplex extracted from the OMI. For example, the one or more PLPs may be located (e.g., the physical location of the one or more PLPs may be determined) based on the L1 signaling, the component identifiers of the handover multiplex, the PLP identifiers of the handover multiplex, and/or the LLP identifiers of the handover multiplex.

Figure 11:
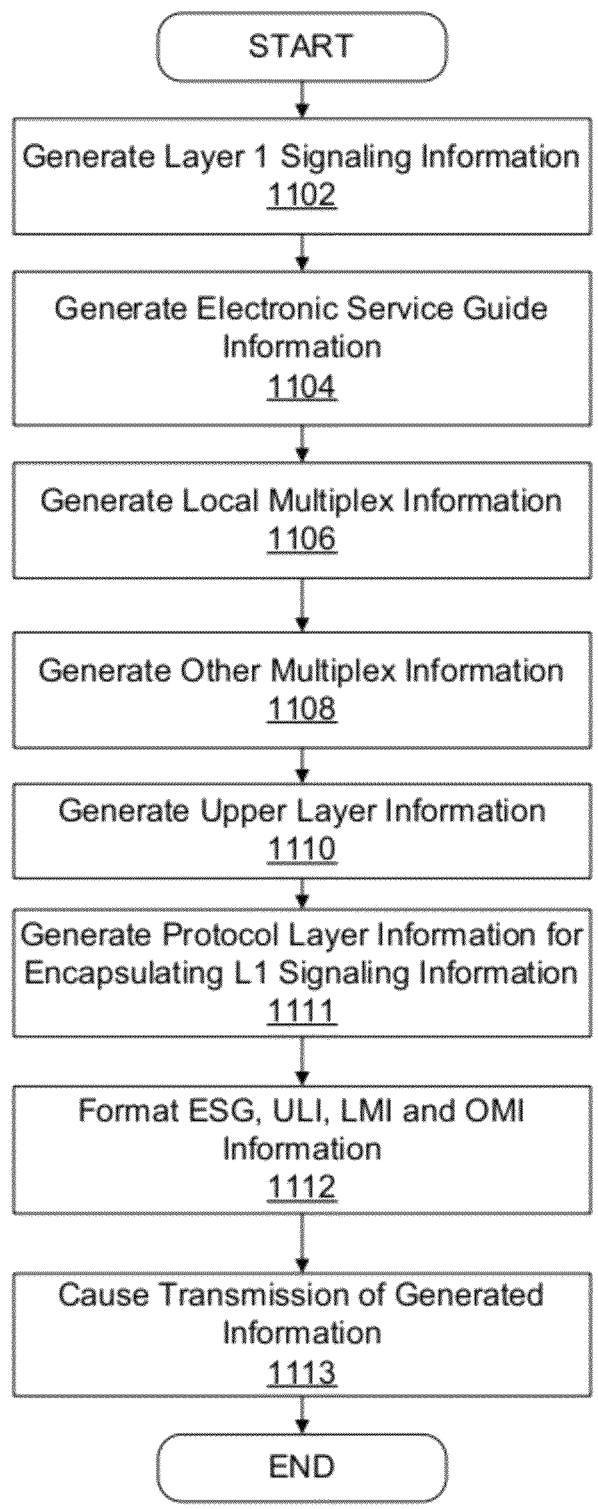
FIG. 11 illustrates an example method for communicating signaling parameters according to one or more embodiments described herein.

FIG. 11 illustrates an example method for communicating signaling parameters. The example method of FIG. 11 may be implemented, for example, by a processor or other element, in one or more various devices and apparatuses of a content provider and/or a service provider (e.g., service provider 125 of FIG. 1A, content provider server 130 of FIG. 1A, digital content sources 104 of FIG. 1B, digital broadcast transmitter 103 of FIG. 1B, transmitter 101 of FIG. 1B, etc.). The various devices and apparatuses may include at least one processor and at least one memory. Additionally, the various devices and apparatuses may include receiving and/or transmitting circuits and hardware interfaces for the transmitting and receiving of signals from the devices and apparatuses. At step 1102, L1 parameters may be generated that associates indexes, such as a PLP identifier, with a physical location. At step 1104, electronic service guide information that associates each service with a uniform resource identifier may be generated. At step 1106, local multiplex information may be generated that associates a component identifier with an index, such as a PLP identifier (e.g., information represented by the structure of LMI section 603 of FIG. 6B and LMI data in section 672 of FIG. 6D) is generated. In certain variation, this local multiplex information may be associated with information in the ESG as illustrated in FIG. 6D.

At step 1108, other multiplex information may be generated that includes information related to one or more available multiplexes (e.g., information represented by the structure of OMI section 653 of FIG. 6C and LMI data in section 673 of FIG. 6D is generated). The information related to the one or more available multiplexes may include information for performing a handover to the available multiplex. Additionally, the information related to the one or more available multiplexes may include the indexes needed to access the physical location of data for one or more services (e.g., component identifiers, PLP identifiers and/or LLP identifiers).

At step 1110, upper layer information is generated that associates a uniform resource identifier with one or more component identifiers (e.g., information represented by the structure of service_association section 503 of FIG. 5 is generated). At step 1111 protocol layer information as described above may be generated to encapsulate the L1 signaling information. In step 1112, the ESG information, the ULI, the LMI, and the OMI is formatted as described above. In certain variations, the ESG information is formatted according to DVB-NGH. Step 1112 may include formatting the ESG according to OMA BCAST ESG, and the ULI, LMI and OMI embedded within the OMA BCAST ESG as illustrated in FIGS. 4A-6D. At step 1113, transmission of the L1 signaling information, the ESG information, the LMI, the OMI, and the ULI to a receiving device is caused to occur (e.g., the generated information is sent to a transmitter and/or transmitter antenna for transmission).

Any of the method steps, operations, procedures or functions described herein may be implemented using one or more processors and/or one or more memory in combination with executable instructions that cause the processors and other components to perform the method steps, procedures or functions. For example, service provider 125, content provider/server 130, digital content sources 104, digital broadcast transmitter 103, antenna 101, and client devices (e.g., devices 105, 110, 115, 120, and 112) may each include one or more processors and/or one or more memory in combination with executable instructions that cause each device/system to perform their respective functions. As used herein, the terms "processor"/"controller" and "computer" whether used alone or in combination with executable instructions stored in a memory or other computer-readable storage medium should be understood to encompass any of various types of well-known computing structures including but not limited to one or more microprocessors, special-purpose computer chips, field-programmable gate arrays (FPGAs), controllers, application-specific integrated circuits (ASICs), combinations of hardware/firmware/software, or other special or general-purpose processing circuitry.

The methods and features recited herein may further be implemented through any number of machine-readable media that are able to store machine executable instructions. Examples of machine readable media that may be used include RAM, ROM, EEPROM, flash memory or other memory technology, CD-ROM, DVD or other optical disk storage, magnetic cassettes, magnetic tape, magnetic storage and the like.

Additionally or alternatively, in at least some embodiments, the methods and features recited herein may be implemented through one or more integrated circuits (ICs). An integrated circuit may, for example, be a microprocessor that accesses machine executable instructions or other data stored in a read only memory (ROM). In some such embodiments, the ROM stores machine executable instructions that cause the IC to perform operations according to one or more of the methods described herein. In at least some other embodiments, one or more the methods described herein are hardwired into an IC. In other words, the IC is in such cases an application specific integrated circuit (ASIC) having gates and other logic dedicated to the calculations and other operations described herein. In still other embodiments, the IC may perform some operations based on execution of machine executable instructions read from ROM or RAM, with other operations hardwired into gates and other logic of IC. Further, the IC may output image data to a display buffer.

As used herein, machine executable instructions include instructions retrieved from a memory and executable instructions in the form of hardwired logic, and combinations of the two. A memory storing machine executable instructions include a ROM, RAM or other data storage component storing instructions that may be retrieved and executed, as well as a portion of an ASIC or other processor containing hardwired logic.

Although specific examples of carrying out the invention have been described, those skilled in the art will appreciate that there are numerous variations and permutations of the above-described systems and methods that are contained within the spirit and scope of the invention as set forth in the appended claims. Additionally, numerous other embodiments, modifications and variations within the scope and spirit of the appended claims will occur to persons of ordinary skill in the art from a review of this disclosure.

We claim:

1. A method comprising:
receiving, at a client device, a digital broadcast signal that includes an electronic service guide identifying one or more services available to the client device, wherein the electronic service guide is received from the digital broadcast signal as a plurality of service guide fragments encapsulated in transport objects and as delivery description data that identifies and provides a location of each of the service guide fragments within a plurality transport streams;

extracting signaling information from the electronic service guide, wherein the signaling information links one of the services in an upper level layer of a broadcast protocol to a physical layer of the broadcast protocol, and wherein the signaling information is included within the delivery description data; and storing the signaling information in a memory of the client device.

2. The method of claim 1, wherein the signaling information is further included within one of the plurality of service guide fragments.

3. The method of claim 1, wherein the plurality of service guide fragments includes session description information describing session initiation procedures for the one of the services.

4. The method of claim 1, wherein the broadcast protocol is a Digital Video Broadcast Next Generation Handheld (DVB-NGH) protocol; wherein the signaling information includes upper level information (ULI), layer 2 signaling information, or a combination of the ULI and the layer 2 signaling information; and wherein the electronic service guide is formatted according to an OMA BCAST standard.

5. The method of claim 4, wherein the layer 2 signaling information includes local multiplex information (LMI), other multiplex information (OMI), or a combination of the LMI and the OMI.

6. The method of claim 1, further comprising:
configuring, based on the signaling information, the client device to receive and extract the one of the services from one or more data streams of the broadcast protocol.

7. The method of claim 1, wherein the delivery description data is comprised within one or more dedicated transport sessions.

8. An apparatus comprising:
at least one processor; and
at least one memory storing machine executable instructions, wherein the at least one memory and the machine executable instructions are configured to, with the at least one processor, cause the apparatus at least to:
receive a digital broadcast signal that includes an electronic service guide identifying one or more services available to the apparatus, wherein the electronic service guide is received from the digital broadcast signal as a plurality of service guide fragments encapsulated in transport objects and as delivery description data that identifies and provides a location of each of the service guide fragments within a plurality transport streams;

extract signaling information from the electronic service guide, wherein the signaling information links one of the services in an upper level layer of a broadcast protocol to a physical layer of the broadcast protocol, and wherein the signaling information is included within the delivery description data; and store the signaling information in the at least one memory.

9. The apparatus of claim 8, wherein the signaling information is further included within one of the plurality of service guide fragments.

10. The apparatus of claim 8, wherein the plurality of service guide fragments includes session description information describing session initiation procedures for the one of the services.

11. The apparatus of claim 8, wherein the broadcast protocol is a Digital Video Broadcast Next Generation Handheld (DVB-NGH) protocol; wherein the signaling information includes upper level information (ULI), layer 2 signaling information, or a combination of the ULI and the layer 2 signaling information; and wherein the electronic service guide is formatted according to an OMA BCAST standard.

12. The apparatus of claim 11, wherein the layer 2 signaling information includes local multiplex information (LMI), other multiplex information (OMI), or a combination of the LMI and the OMI.

13. The apparatus of claim 8, wherein the at least one memory and the machine executable instructions are configured to, with the at least one processor, further cause the apparatus at least to:
based on the signaling information, receive and extract the one of the services from one or more data streams of the broadcast protocol.

14. The apparatus of claim 8, wherein the delivery description data is comprised within one or more dedicated transport sessions.

* * * * *

UNITED STATES PATENT AND TRADEMARK OFFICE
CERTIFICATE OF CORRECTION

PATENT NO.         : 8,744,010 B2                          Page 1 of 1
APPLICATION NO.    : 13/106486
DATED              : June 3, 2014
INVENTOR(S)        : Jani Petter Väre et al.

It is certified that error appears in the above-identified patent and that said Letters Patent is hereby corrected as shown below:

On the title page, Column 2, item (57) Abstract, Line 8:
        Delete "accesses" and insert --accessed--, therefor Signed and Sealed this
Twenty-first Day of October, 2014

Michelle K. Lee
*Deputy Director of the United States Patent and Trademark Office*